United States Patent
Hayashi et al.

(10) Patent No.: US 10,611,461 B2
(45) Date of Patent: Apr. 7, 2020

(54) FLAP AND AIRCRAFT

(71) Applicants: MITSUBISHI AIRCRAFT CORPORATION, Aichi (JP); Japan Aerospace Exploration Agency, Tokyo (JP)

(72) Inventors: Kensuke Hayashi, Aichi (JP); Mitsuhiro Murayama, Tokyo (JP); Kazuomi Yamamoto, Tokyo (JP)

(73) Assignees: Mitsubishi Aircraft Corporation, Aichi (JP); Japan Aerospace Exploration Agency, Tokyo (JP)

( * ) Notice: Subject to any disclaimer, the term of this patent is extended or adjusted under 35 U.S.C. 154(b) by 6 days.

(21) Appl. No.: 15/577,712

(22) PCT Filed: Apr. 14, 2016

(86) PCT No.: PCT/JP2016/002012
§ 371 (c)(1),
(2) Date: Nov. 28, 2017

(87) PCT Pub. No.: WO2016/189793
PCT Pub. Date: Dec. 1, 2016

(65) Prior Publication Data
US 2018/0155007 A1 Jun. 7, 2018

(30) Foreign Application Priority Data
May 28, 2015 (JP) .................................. 2015-108344

(51) Int. Cl.
*B64C 9/20* (2006.01)
*B64C 23/06* (2006.01)
(Continued)

(52) U.S. Cl.
CPC .................. *B64C 9/20* (2013.01); *B64C 9/16* (2013.01); *B64C 23/06* (2013.01); *B64C 23/065* (2013.01);
(Continued)

(58) Field of Classification Search
CPC ..... B64C 9/18; B64C 23/065; B64C 2230/08; B64C 2230/14; B64C 2003/148
See application file for complete search history.

(56) References Cited

U.S. PATENT DOCUMENTS 3,578,264 A * 5/1971 Kuethe .................. B64C 21/10
181/220
5,253,828 A 10/1993 Cox
(Continued)

FOREIGN PATENT DOCUMENTS

| EP | 2 692 632 A1 | 2/2014 |
|---|---|---|
| JP | 5286527 B2 | 9/2013 |
| WO | 2011/007759 A1 | 1/2011 |

OTHER PUBLICATIONS

English translation of International Preliminary Report on Patentability for corresponding International Application No. PCT/JP2016/002012, dated Dec. 7, 2017 (10 pages).
(Continued)

*Primary Examiner* — Brian M O'Hara
*Assistant Examiner* — Michael B. Kreiner
(74) *Attorney, Agent, or Firm* — Osha Liang LLP

(57) ABSTRACT

A flap of an aircraft includes a flap body that is provided deployably with respect to a main wing, an inclined portion that protrudes from an upper surface of a tip part on at least an outboard side in a span direction of the flap body and is inclined with respect to an aircraft axis direction, and a protruding portion that smoothly protrudes from a lower surface of the tip part on at least the outboard side. A rear end
(Continued)

of the inclined portion is located closer to a side end edge of the tip part in the span direction of the flap body than a virtual line that passes through a front end of the inclined portion and is parallel to the aircraft axis direction.

21 Claims, 17 Drawing Sheets

(51) Int. Cl.
    *B64C 9/16*     (2006.01)
    *B64C 3/50*     (2006.01)

(52) U.S. Cl.
    CPC ............ *B64C 3/50* (2013.01); *B64C 2230/14* (2013.01); *Y02T 50/164* (2013.01); *Y02T 50/44* (2013.01)

(56) References Cited

U.S. PATENT DOCUMENTS

| | | |
|---|---|---|
| 6,105,904 A | 8/2000 | Lisy et al. |
| 2004/0129838 A1 | 7/2004 | Lisy et al. |
| 2008/0265102 A1 | 10/2008 | Larssen et al. |
| 2011/0008174 A1 | 1/2011 | Ireland |
| 2012/0145826 A1* | 6/2012 | Hirai .................. B64C 3/48 244/1 N |
| 2013/0037657 A1 | 2/2013 | Breidenthal |

OTHER PUBLICATIONS

Extended European Search Report in counterpart European Application No. 16799510.9 dated Oct. 22, 2018 (13 pages).

M. Martuccio; "A Wind Tunnel Investigation of the Effects of Micro-Vortex Generators and Gurney Flaps on the High-Lift Characteristics of a Business Jet Wing"; Retreived from Internet on Oct. 5, 2018: Retreived from: URL: https://ntrs.nasa.gov/archive/nasa/casi.ntrs.nasa.gov/19950024406.pdf (144 pages).

A. Abbas et al; "Aerodynamic technologies to improve aircraft performance"; Aerospace Science and Technology, vol. 28, No. 1, pp. 100-132; Oct. 30, 2012 (34 pages).

J. Lin et al; "Review of research on low-profile vortex generators to control boundary-layer seperation"; Progress in Aerospace Sciences, vol. 38, pp. 389-420; Jan. 1, 2002 (32 pages).

\* cited by examiner

FLAP AND AIRCRAFT

BACKGROUND

Technical Field

The present invention relates to a flap provided on an aircraft.

Related Art

A flap serving as a high lift device is provided on a trailing edge of a main wing of an aircraft. The flap is deployed rearward and downward in takeoff and landing to generate necessary lift.

When the flap is deployed from the main wing, a wing-tip vortex occurs at a wing tip of the flap. To reduce noise caused by the wing-tip vortex, a protruding portion that protrudes downward is provided on a lower surface of the wing tip of the flap in Patent Literature 1. The protruding portion is formed in a streamlined shape such that a protrusion amount is gradually changed.

CITATION LIST

Patent Literature

Patent Literature 1: Japanese Patent No. 5286527

SUMMARY OF INVENTION

Providing the protruding portion disclosed in Patent Literature 1 on the lower surface of the flap makes it possible to weaken the wing-tip vortex and to distance the wing-top vortex from the surface of the flap. Therefore, it is possible to achieve a certain noise reduction effect.

The form of the flap, however, has room for improvement as quietness of an aircraft is increasingly required.

Therefore, one or more embodiments of the present invention make it possible to reduce noise caused by the wing-tip vortex of the flap and to provide a flap including the device.

A flap of an aircraft according to one or more embodiments of the present invention includes: a flap body that is provided deployably with respect to a main wing; an inclined portion that protrudes from an upper surface of a tip part on at least an outboard side in a span direction of the flap body and is inclined with respect to an aircraft axis direction; and a protruding portion that smoothly protrudes from a lower surface of the tip part on at least the outboard side, in which a rear end of the inclined portion is located closer to a side end edge of the tip part in the span direction of the flap body than a virtual line that passes through a front end of the inclined portion and is parallel to the aircraft axis direction.

In addition, a flap of an aircraft according to one or more embodiments of the present invention includes: a flap body that is provided deployably with respect to a main wing; and an inclined portion that protrudes from an upper surface of a tip part on at least an outboard side in a span direction of the flap body and is inclined with respect to an aircraft axis direction, in which the tip part on at least the outboard side is smoothly formed on a lower surface side, and a rear end of the inclined portion is located closer to a side end edge of the tip part in the span direction of the flap body than a virtual line that passes through a front end of the inclined portion and is parallel to the aircraft axis direction.

In the flap according to one or more embodiments of the present invention, the inclined portion may be disposed within a region from a position of the side end edge of the flap body to a position that is separated from the side end edge by a chord length of the flap body in the span direction.

The flap according to one or more embodiments of the present invention may include two or more inclined portions, and the inclined portions may be arranged in the span direction with predetermined intervals.

In the flap according to one or more embodiments of the present invention, the front end and the rear end of the inclined portion may be both disposed near a leading edge of the flap body. In addition, according to one or more embodiments of the present invention, the inclined portion may be exposed from the main wing when the flap body is totally deployed, and the inclined portion may be hidden by the main wing when the flap body is retracted in the main wing.

An aircraft according to one or more embodiments of the present invention includes the above-described flap.

As described later in detail, it is possible to weaken the wing-tip vortex through interference of a vortex generated by the inclined portion, and to distance the wing-tip vortex from the surface of the flap while the wing-tip vortex is drawn into the vortex generated by the inclined portion. This reduces the pressure fluctuation of the airflow flowing through the surface of the flap.

In addition, the pressure fluctuation of the airflow flowing through the surface of the flap is also reduced by the protruding portion that protrudes from the lower surface of the tip part of the flap body on at least the outboard side or a configuration in which the tip part of the flap body on at least the outboard side is smoothly formed on the lower surface side.

A synergetic effect of the above-described action makes it possible to largely reduce noise caused by the flap.

DETAILED DESCRIPTION

Some embodiments of the present invention are described below with reference to accompanying drawings.

First Embodiment

Figure 1:
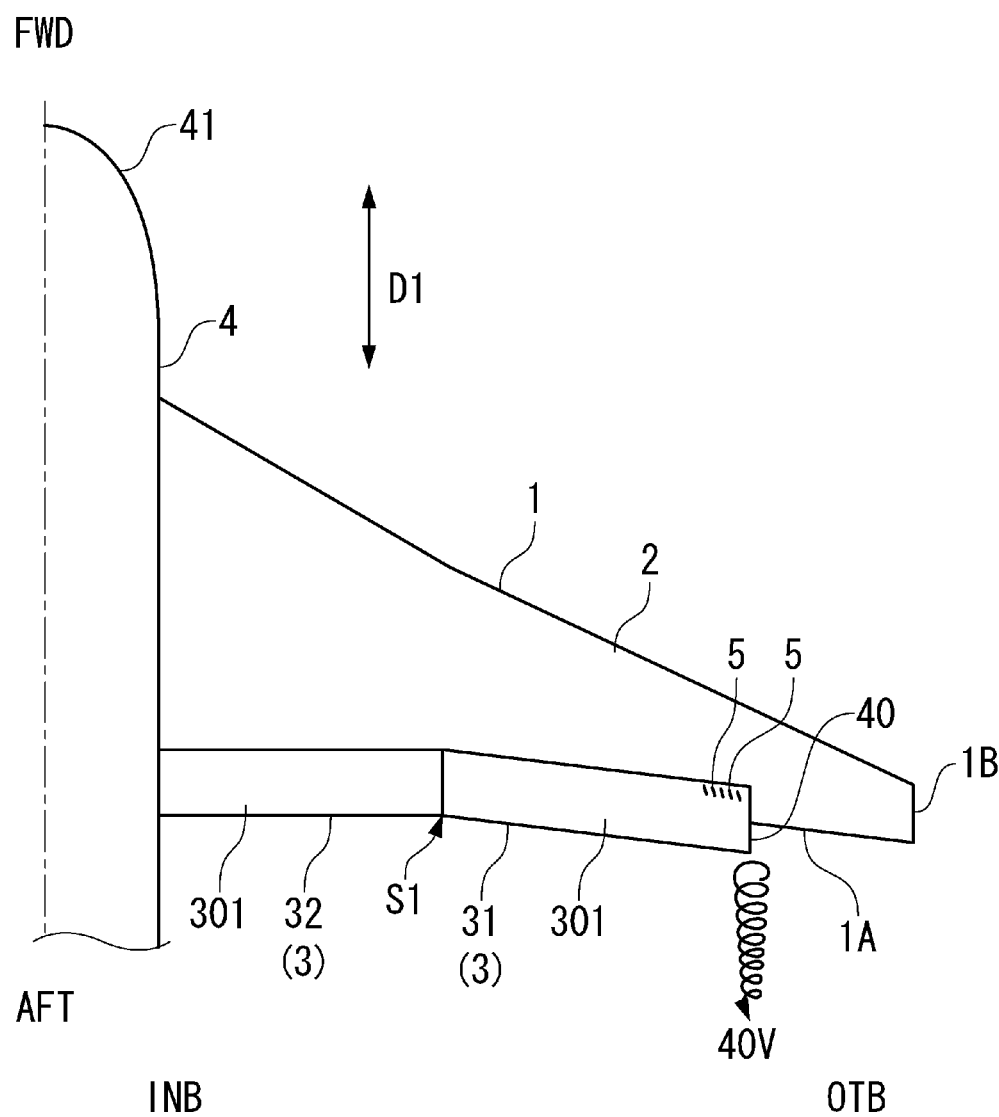
FIG. 1 is a plan view illustrating a starboard of an aircraft according to a first embodiment.

A flap 3 is provided on a trailing edge 1A of a main wing 1 of an aircraft according to a first embodiment illustrated in FIG. 1.

The main wing 1 includes a main wing body 2 and a flap 3. The flap 3 is so provided as to be deployable on the main wing body 2.

The flap 3 is deployed from the main wing body 2 as illustrated in FIG. 1, thereby generating high lift during low-speed flight such as takeoff and landing.

The flap 3 includes an outboard flap 31 and an inboard flap 32. The outboard flap 31 is located on wing tip 1B side of the main wing 1. The inboard flap 32 is located on fuselage 4 side on which the main wing 1 is provided. The outboard flap 31 and the inboard flap 32 are collectively referred to as the flap 3.

The outboard flap 31 and the inboard flap 32 are deployed at the same time, and are retracted at the same time. A gap S1 between the outboard flap 31 and the inboard flap 32 is sealed with a rubber seal.

In the following, a direction along an axial line (an alternate long and short dash line) set in the fuselage 4 is defined as an aircraft axis direction D1. A nose 41 side of the aircraft in the aircraft axis direction D1 is referred to as a "front" side, and a tail unit side is referred to as a "rear" side.

In addition, on each of left and right sides of the fuselage 4, the fuselage 4 side in a span direction of the main wing 1 is referred to as an inboard side, and a side opposite thereto is referred to as an outboard side.

Further, an upper surface side of the main wing 1 that corresponds to a negative pressure surface is referred to as an "upper" side, and a lower surface side of the main wing 1 that corresponds to a positive pressure surface is referred to as a "lower" side.

Note that, in the drawings, the "front" side is denoted by "FWD", the "rear" side is denoted by "AFT", the "upper" side is denoted by "UPR", the lower side is denoted by "LWR", the "inboard" side is denoted by "INB", and the "outboard" side is denoted by "OTB".

Figure 2A:
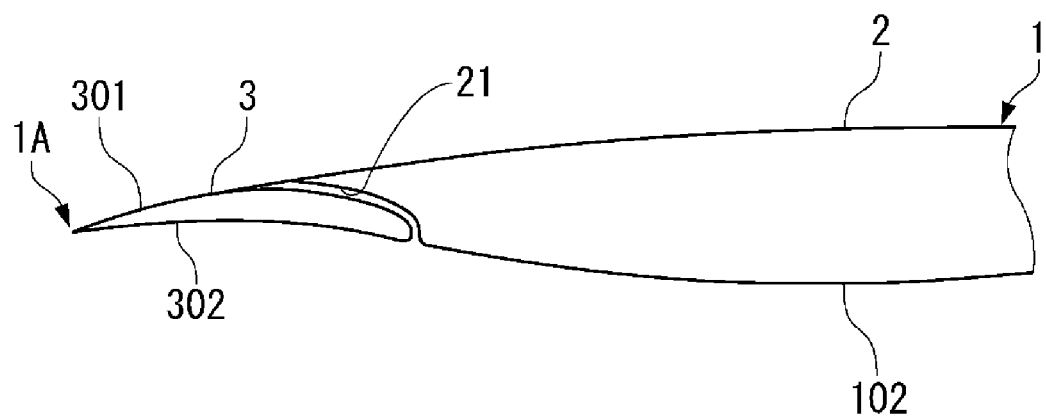
FIG. 2A is a diagram illustrating a state in which a flap of the aircraft is retracted.

As illustrated in FIG. 2A, the flap 3 is retracted inside a housing section 21 that is prepared in the main wing body 2 while the aircraft cruises at high speed. At this time, the flap 3 is integrated with the main wing body 2 and configures the trailing edge 1A of the main wing 1. When the flap 3 is retracted, a lower surface 302 of the flap 3 is totally exposed from the lower side of the main wing body 2.

The flap 3 is deployed rearward and downward when being driven by an unillustrated actuator. At this time, the flap 3 is guided by an unillustrated track.

Figure 2B:
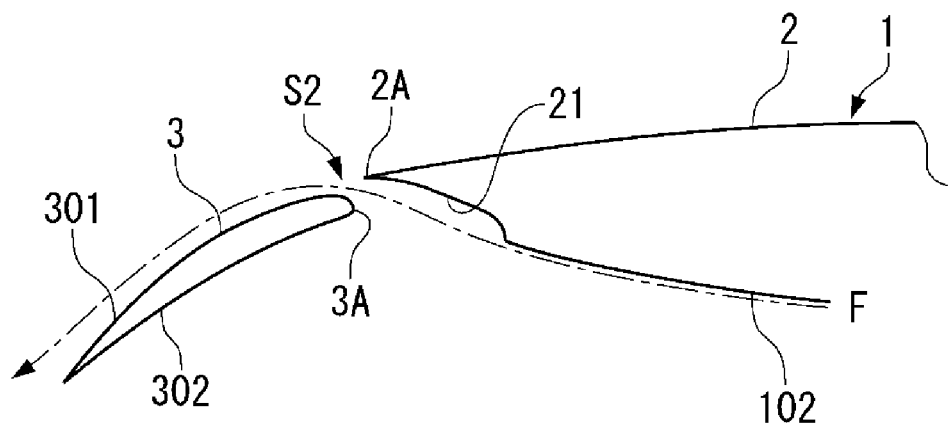
FIG. 2B is a diagram illustrating the flap is deployed.

FIG. 2B illustrates a state in which the flap 3 is deployed up to a flap position in landing. At this time, since the flap 3 is totally exposed from the main wing body 2, the area of the main wing 1 is increased. A clearance S2 is provided between a leading edge 3A of the flap 3 and a trailing edge 2A of the main wing body 2.

When the flap 3 is deployed, airflow F from a lower surface 102 side of the main wing 1 is throttled by the clearance S2, thereby flowing toward the upper surface 301 of the flap 3 at high speed, as illustrated by an alternate long and short dash line in FIG. 2B. In addition, an angle of attack is provided to the flap 3. Therefore, a difference of flow velocity between the upper surface 301 side and the lower surface 302 side of the flap 3 is large. As a result, a large pressure difference corresponding to the difference of the flow velocity is obtainable, which makes it possible to contribute to generation of high lift.

As illustrated in FIG. 1, the flap 3 includes a wing tip 40 that is placed under the airflow when the flap 3 is deployed. The wing tip 40 corresponds to a tip part of the outboard flap 31 on the outboard OTB side. A wing-tip vortex 40V is caused, at the wing tip 40, by the airflow that goes around from the lower surface 302 side of the flap 3 to the upper surface 301 side due to the above-described pressure difference.

The wing-tip vortex 40V is described with reference to FIG. 3 that illustrates a basic form of the flap 3.

Figure 3:
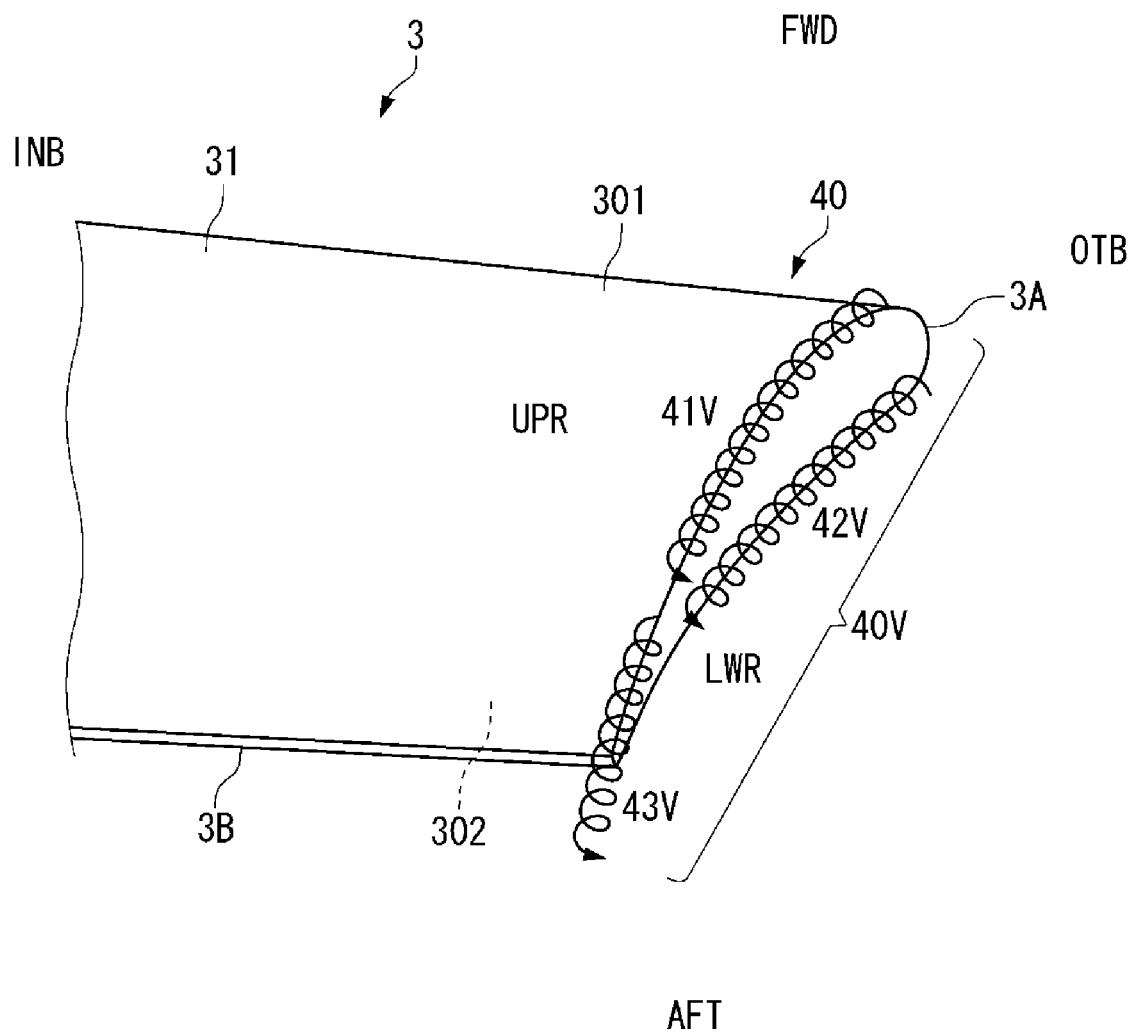
FIG. 3 is a diagram illustrating a basic form of the flap and a wing-tip vortex.

As illustrated in FIG. 3, the vortex occurred at the leading edge 3A of the wing tip 40 heads to the upper surface 301 side and the lower surface 302 side of the flap 3. An upper vortex 41V and a lower vortex 42V flow rearward respectively while drawing spiral in a direction from the lower surface 302 side toward the upper surface 301 side. Thereafter, the lower vortex 42V gradually moves upward is merged with the upper vortex 41V. The upper vortex 41V, the lower vortex 42V, and a merged vortex 43V are collectively referred to as the wing-tip vortex 40V.

In the present embodiment, a tip part of the inboard flap 32 (FIG. 1) on the inboard INB side is in proximity to the fuselage 4, and the gap S1 between the inboard flap 32 and the outboard flap 31 is blocked by the seal. Therefore, the wing-tip vortex does not occur or is small if it occurs, at both tip parts of the inboard flap 32 and the tip part of the outboard flap on the inboard INB side.

The pressure induced by the airflow that forms the wing-tip vortex 40V occurred at the wing tip 40 of the flap 3 is temporally and spatially fluctuated, and the pressure fluctuation is propagated to the periphery, which causes noise. As compared with takeoff at which the flap 3 is deployed halfway, the pressure difference caused by the difference of the flow velocity between the upper surface 301 and the lower surface 302 is increased to cause larger noise in landing at which the flap 3 is so deployed the whole way as to be totally exposed (FIG. 2B). In addition, the noise from the wing tip 40 of the flap 3 is notable because the output of an engine generating noise is low in landing.

Figure 4:
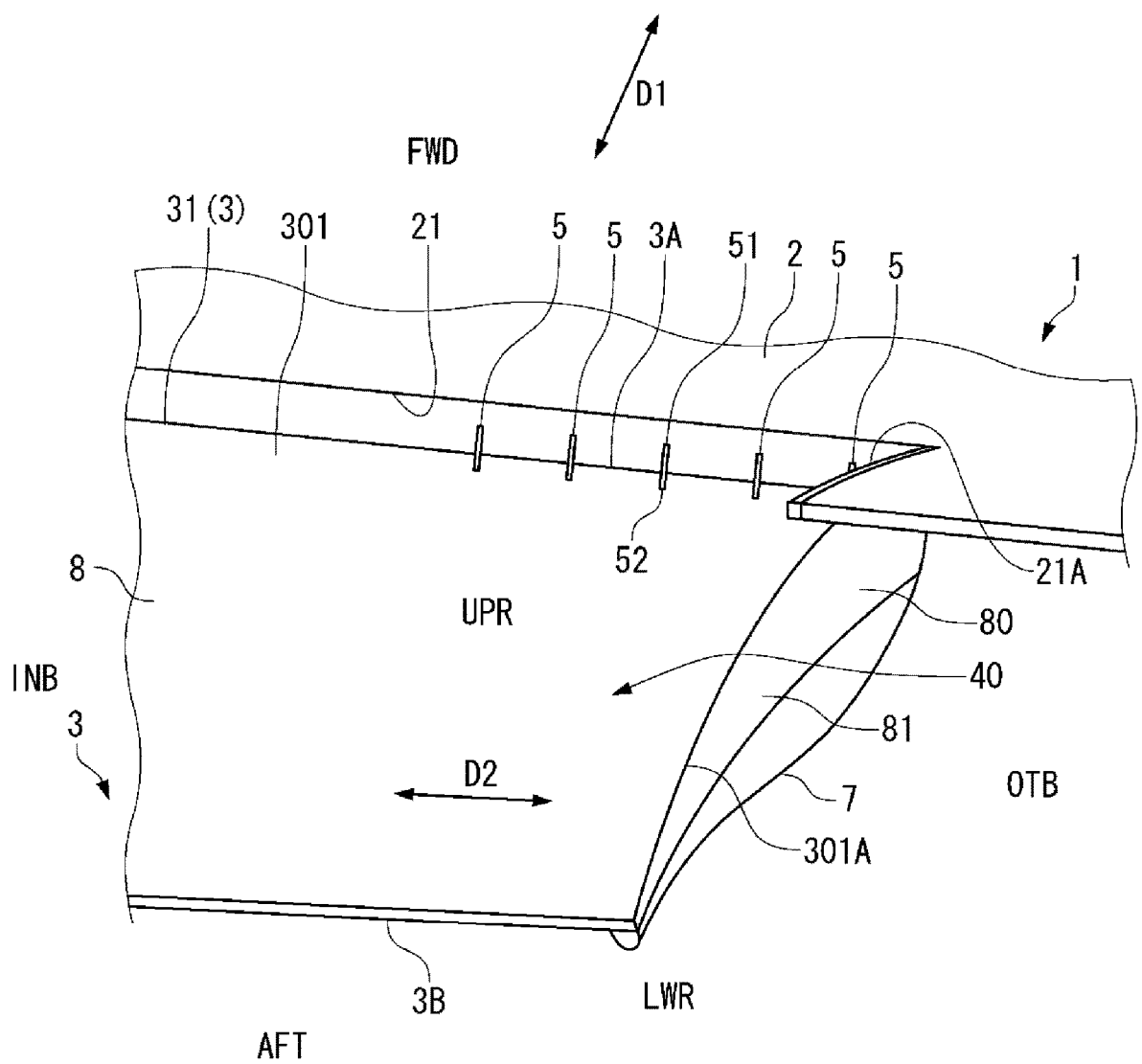
FIG. 4 is a perspective view illustrating inclined portions that are provided as a noise reduction device on a wing tip and an upper surface of the flap.
Figure 5:
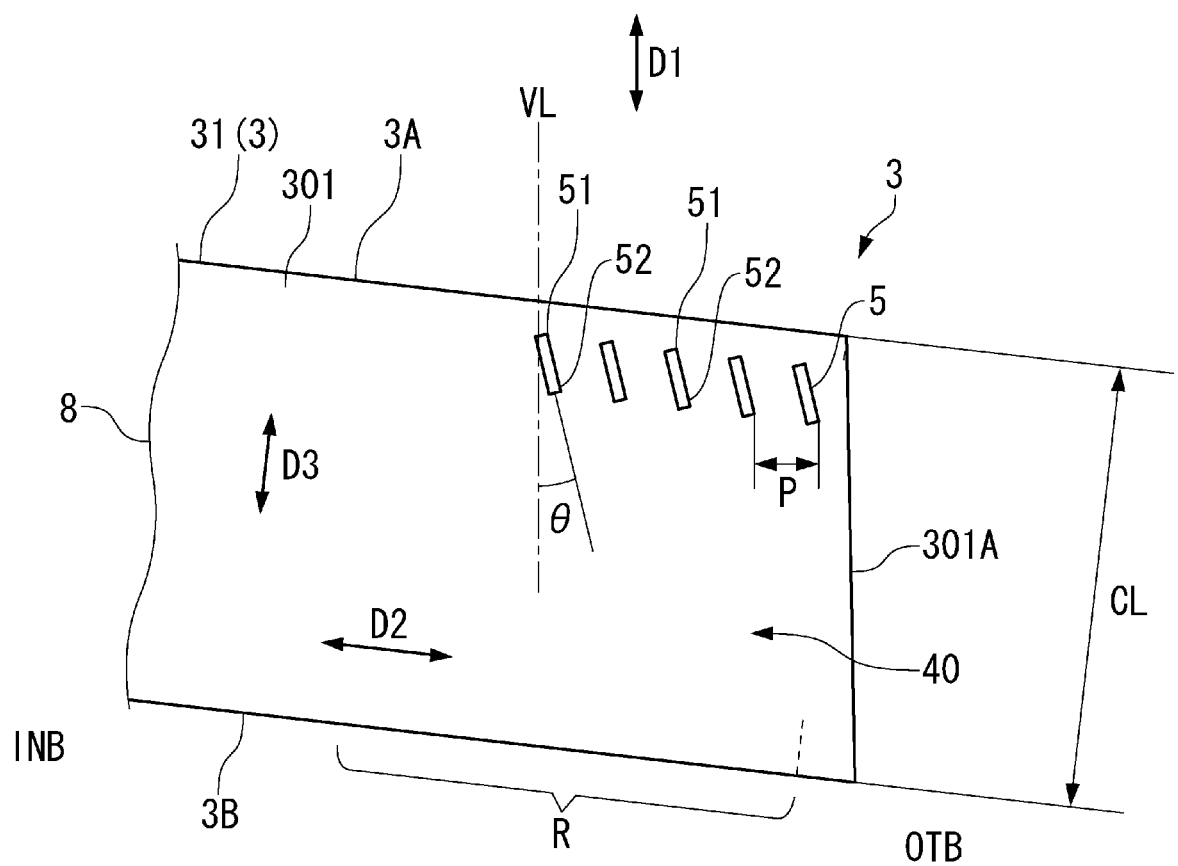
FIG. 5 is a plan view illustrating the inclined portions that are provided as the noise reduction device on the wing tip and the upper surface of the flap.

To reduce the noise caused by the wing-tip vortex 40V in landing, the flap 3 includes inclined portions 5 serving as a noise reduction device, at the wing tip 40 of the upper surface 301, as illustrated in FIG. 4 and FIG. 5.

The flap 3 according to the present embodiment further includes a protruding portion 7 that is another noise reduction device.

The flap 3 includes the inclined portions 5, the protruding portion 7, and a flap body 8 on which the inclined portions 5 and the protruding portion 7 are provided. Each of the components of the flap 3 may be formed with use of an appropriate material such as a metal and a fiber-reinforced resin.

Although specific illustration is omitted, the flap body 8 has a box structure that includes a plurality of ribs, a front spar, a rear spar, an upper skin, and a lower skin. The plurality of ribs are arranged along the aircraft axis direction D1. The front spar couples respective front ends of the ribs, and the rear spar couples respective rear ends of the ribs.

The flap body 8 has a shape in which a dimension in the span direction of the main wing 1 is longer than a dimension in the aircraft axis direction D1, and has a wing-shaped cross-section. An end rib 80 is disposed on each of end parts of the flap body 8. The end rib 80 forms an end surface 81 of the flap body 8. When the flap 3 is retracted, an inner wall 21A that is provided on the housing section 21 of the main wing body 2 faces the end surface 81. The end surface 81 of the outboard flap 31 on the outboard OTB side according to the present embodiment is inclined with respect to the aircraft axis direction D1 but may be formed in parallel with the aircraft axis direction D1.

Out of the two noise reduction devices, the configurations of the inclined portions 5 that respectively generate vortices interfering the wing-tip vortex 40V to reduce noise is first described. The inclined portions 5 are so provided on the wing tip 40 of the flap body 8 as to protrude from the upper surface 301 in an out-of-plane direction, and are inclined with respect to the aircraft axis direction D1. An inclination angle θ (FIG. 5) of each of the inclined portions 5 is, for example, about 20 degrees.

The flap 3 according to the present embodiment includes the plurality of inclined portions 5. The inclined portions 5 are inclined in the same direction to the aircraft axis direction D1, and are extended by a predetermined length.

The inclined portions 5 are arranged in the span direction D2 (the wing width) of the flap 3 with predetermined intervals.

The inclined portions 5 are not necessarily arranged with equivalent intervals.

In addition, the inclined portions 5 are not necessarily formed with the same height, the same inclined angle, and the same length.

The respective positions of the inclined portions 5 in a chord direction D3 (FIG. 5) may be not uniform. For example, the plurality of inclined portions 5 may be arranged with intervals in the span direction D2 while being staggered in front-rear direction.

Further, the inclined portions 5 may be so arranged as to form a plurality of lines. For example, the inclined portions 5 in a first line may be arranged near the leading edge 3A of the flap 3, and the inclined portions 5 in a second line may be arranged behind the inclined portions in the first line.

As illustrated in FIG. 4 and FIG. 5, each of the inclined portions 5 includes a front end 51 located on the front side and a rear end 52 located on the rear side.

The front end 51 is disposed near the leading edge 3A of the flap body 8.

When a virtual line VL (FIG. 5) that passes through the front end 51 and is parallel to the aircraft axis direction D1 is assumed, the rear end 52 is located on side closer to a side end edge 301A of the upper surface 301 of the flap body 8 than the virtual line VL.

In other words, each of the inclined portions 5 is so inclined with respect to the aircraft axis direction D1 as to come close to the side end edge 301A of the upper surface 301 from the front end 51 toward the rear end 52.

Each of the inclined portions 5 according to the present embodiment is a protrusion formed to have a rectangular cross-section over the entire length from the front end 51 to the rear end 52. The form of each of the inclined portions 5 is not limited thereto, and may be appropriately determined. For example, an inclined portion that is formed in a triangle shape as viewed from the span direction D2 or an inclined portion that is formed in a semicircular shape as viewed from the span direction D2 may be adopted.

When the flap 3 is deployed up to the landing position as illustrated in FIG. 4, the inclined portions 5 are exposed from the main wing body 2 over the entire length.

Figure 6:
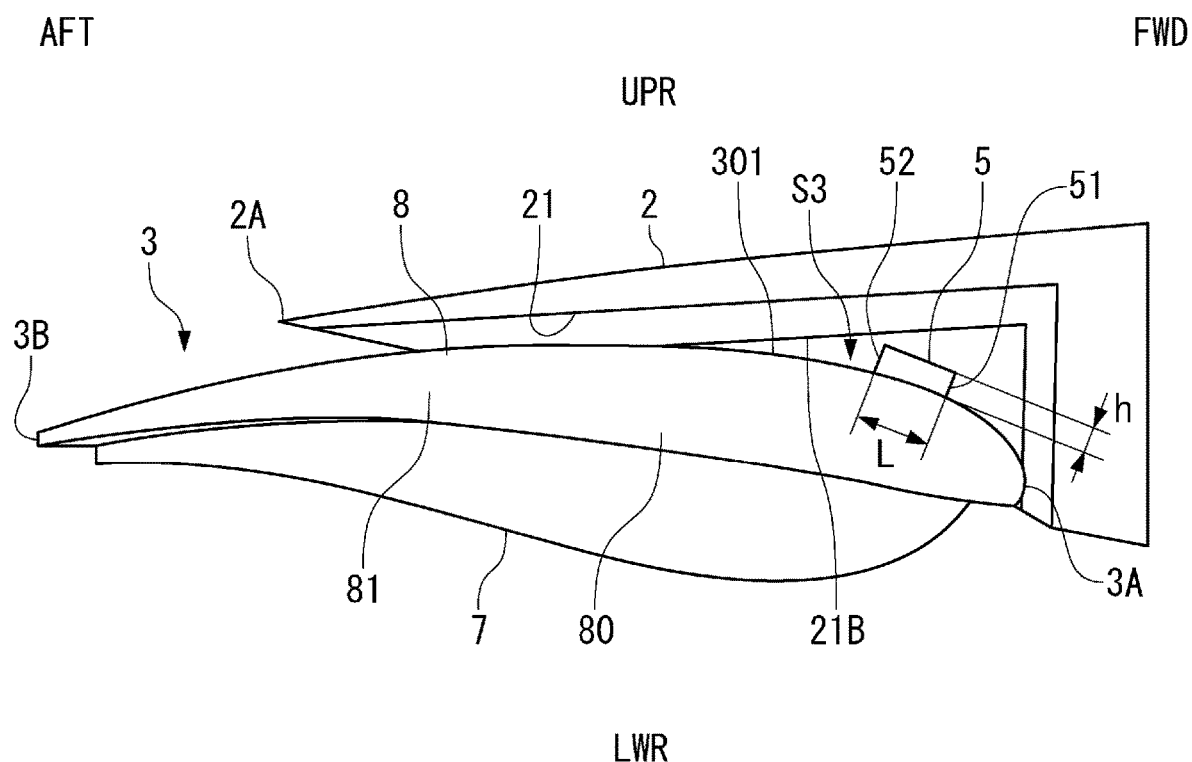
FIG. 6 is a side view illustrating an end surface of the flap.

In contrast, in cruising, the rear ends 52 of the respective inclined portions 5 are located on the front side than the trailing edge 2A of the main wing body 2, and the entire inclined portions 5 are hidden by the main wing body 2, as illustrated in FIG. 6.

When the flap 3 is deployed, the inclined portions 5 are exposed to the airflow and exerts the noise reduction effect.

When being hidden by the main wing body 2, the inclined portions 5 are disposed in a space S3 between the upper surface 301 of the flap 3 and a wall 21B of the housing section 21 prepared in the main wing body 2.

When the flap 3 is deployed to the predetermined takeoff position, the inclined portions 5 may be exposed from the main wing body 2 or located inside the space S3.

When the flap 3 is deployed, a slot through which the airflow from the lower surface side of the main wing body 2 flows is formed between the main wing body 2 and the flap 3. Therefore, even if being not exposed from the main wing body 2, the inclined portions 5 exert the noise reduction effect when being exposed to the airflow flowing through the slot.

Each of the inclined portions 5 is formed to have a predetermined height so as to be housed in the space S3.

A predetermined clearance is provided between an upper end of each of the inclined portions 5 and the wall 21B of the housing section 21. This makes it possible to prevent the inclined portions 5 from interfering the main wing and surrounding members (such as a spoiler).

According to one or more embodiments of the present invention, the height of each of the inclined portions 5 from the upper surface 301 may be two times or larger than a thickness of a boundary layer that occurs on the surface of the flap body 8 on which the inclined portions 5 are disposed, in order to generate vortices 5V (FIG. 9) that interfere the wing-tip vortex 40V as described later. The height of each of the inclined portions 5 from the upper surface 301 may be appropriately determined insofar as the inclined portions 5 do not interfere the main wing body 2 and the like.

When a length of each of the inclined portions 5 is denoted by L and the height thereof is denoted by h, according to one or more embodiments of the present invention, the relationship between the length and the height of each of the inclined portions 5 may satisfy L/h>1. Moreover, according to one or more embodiments of the present invention, L/h is within a range of 3 to 10. If L/h is excessively small, the generated vortex 5V becomes weak. Therefore, the noise reduction effect achieved through interference of the vortex 5V to the wing-tip vortex 40V becomes small. In addition, even if L/h is excessively large, the generated vortex 5V becomes excessively strong. As a result, the generated vortex 5V may become a new noise source or may deteriorate aerodynamic performance.

The inclination angle θ (FIG. 5) of each of the inclined portions 5 with respect to the aircraft axis direction D1 may be appropriately determined insofar as each of the inclined portions can generate a vortex 5V that suitably interferes the wing-tip vortex 40V.

According to one or more embodiments of the present invention, the inclination angle θ of each of the inclined portions 5 is within a range of 10 degrees to 30 degrees. If the inclination angle θ is smaller than the above-described angle range, the generated vortex 5V becomes weak. Accordingly, the noise reduction effect achieved through interference of the vortex 5V to the wing-tip vortex 40V becomes small. In contrast, if the inclination angle θ is larger than the above-described angle range, the generated vortex 5V becomes excessively strong. As a result, the generated vortex 5V may become a new noise source or may deteriorate aerodynamic performance.

An optimum inclination angle θ at which excellent noise reduction effect was confirmed in a wind tunnel test described later is 20 degrees.

A pitch P between the adjacent inclined portions 5 (FIG. 5) may be appropriately determined. According to one or more embodiments of the present invention, a ratio (P/h) to the height h is within a range of 2 to 10 (both inclusive). When the pitch P is within the range, it is possible to successively and sufficiently cause vortices 5V that are generated by the respective inclined portions 5 adjacent to one another, to interfere the wing-tip vortex 40V while suppressing interference between the vortices 5V.

In contrast, if the ratio P/h is smaller than 2, the vortices 5V that are generated by the respective inclined portions 5 adjacent to one another interfere one another and energy of each of the vortices 5V is dispersed, which makes it difficult to cause the vortices 5V to sufficiently interfere the wing-tip vortex 40V. Further, if the ratio P/h is larger than 10, each of the vortices 5V intermittently interferes the wing-tip vortex 40V, which makes it difficult to sufficiently reduce noise.

An appropriate number of inclined portions 5 may be provided on the flap body 8. The plurality of inclined portions 5 are not necessarily provided, and only one inclined portion 5 may be provided on the flap body 8.

The inclined portions 5 may be integrally formed with the flap body 8 in manufacturing of the flap body 8, or the inclined portions 5 that have been fabricated separately from the flap body 8 may be joined to the upper surface 301 of the flap body 8 through an appropriate method such as bonding and fastening.

According to one or more embodiments of the present invention, the inclined portions 5 may be located in a position anterior to a position Ps (FIG. 8C) at which the lower wing-tip vortex 42V, described below, moving upward is merged with the upper wing-tip vortex 41V, in the chord (a wing chord) direction D3 of the flap 3 (FIG. 5). Therefore, according to one or more embodiments of the present invention, in the chord direction D3, the front end 51 of each of the inclined portions 5 may be positioned within a range of 0% to 60% of a chord length CL (a wing chord length) of the flap body 8 from the leading edge 3A of the flap body 8.

The front end 51 of each of the inclined portions 5 according to the present embodiment is away from the leading edge 3A by about 10% of the chord length CL of the flap body 8 in the chord direction D3.

In addition, according to one or more embodiments of the present invention, the inclined portions 5 may be disposed within a region R (FIG. 5) from the position of the side end edge 301A adjacently located to a position separated from the side end edge 301A by the chord length CL in the span direction D2. Pressure fluctuation of the airflow caused by the wing-tip vortex 40V is remarkably large over the region R. Therefore, disposing the inclined portions at those positions makes it possible to surely reduce the noise caused by the wing-tip vortex 40V.

In the case where the plurality of inclined portions 5 are provided as with the present embodiment, the leading inclined portion 5 that is closest to the side end edge 301A in the arrangement direction of the inclined portions 5 (in the span direction D2) is disposed just near the side end edge 301A, and the other inclined portions 5 may be arranged at positions separately from the leading inclined portion 5 by a predetermined pitch P.

Next, a configuration of the protruding portion 7 that is another noise reduction device is described.

Figure 7A:
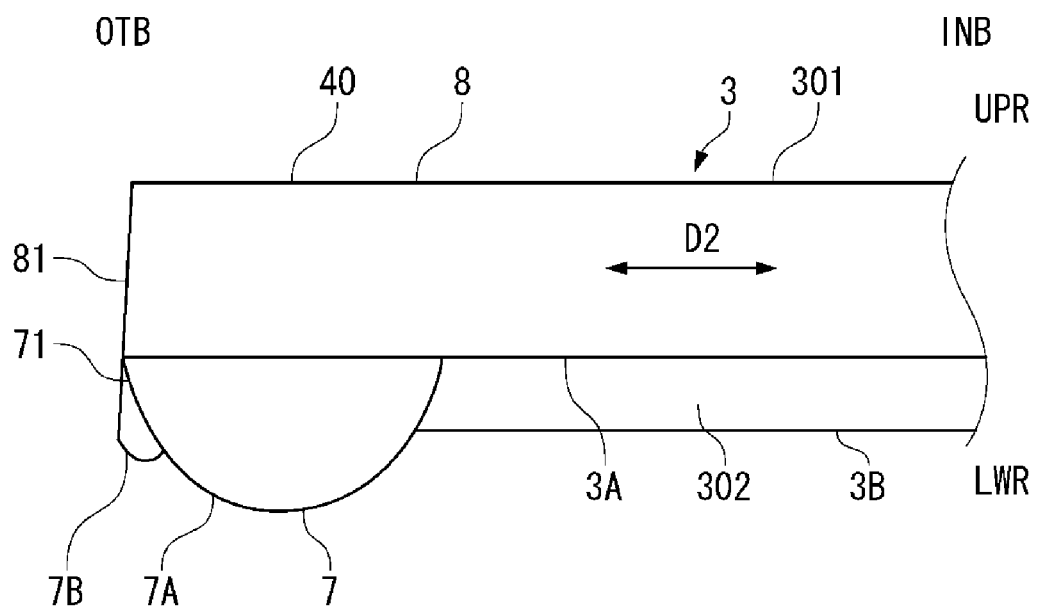
FIG. 7A is a diagram illustrating a device provided on a lower surface of the flap as viewed from a front side.
Figure 7B:
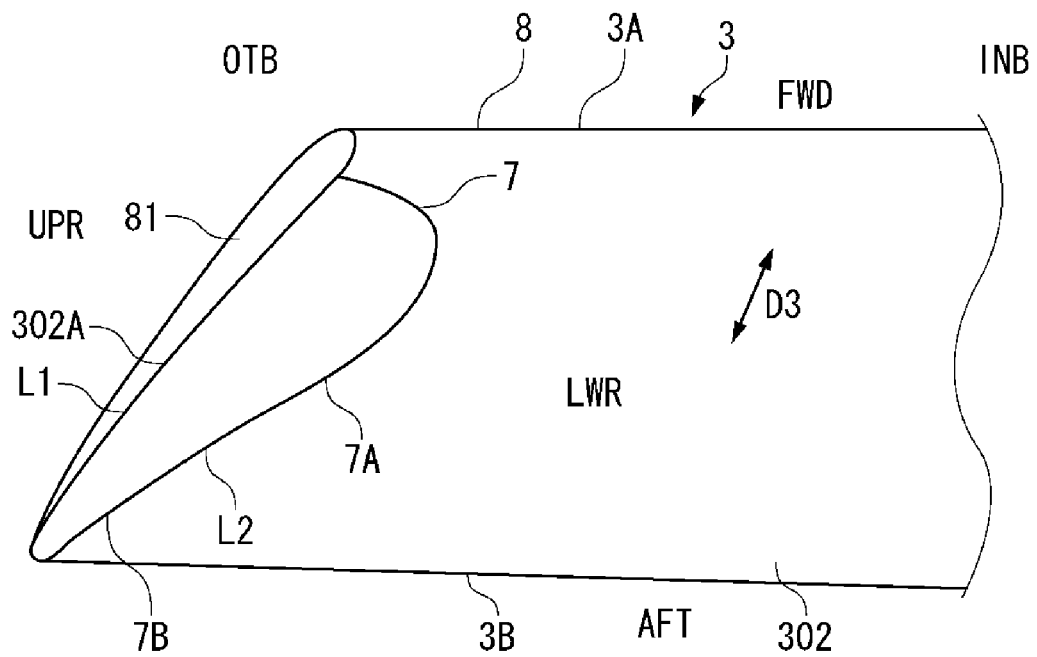
FIG. 7B is a perspective view of the device provided on the lower surface of the flap.

As illustrated in FIGS. 7A and 7B, the protruding portion 7 is so provided on the lower surface 302 of the wing tip 40 of the flap body 8 as to smoothly protrude from the lower surface 302 in the out-of-plane direction. Note that illustration of the inclined portions 5 is omitted in FIG. 7A.

The protruding portion 7 is provided on the lower surface 302 that is constantly exposed from the main wing body 2, and exerts the noise reduction effect not only in landing but also in takeoff.

To reduce a weight, according to one or more embodiments of the present invention, the protruding portion 7 may be formed in a hollow shape and a core material may be disposed inside the protruding portion 7.

As illustrated in FIG. 7B, the protruding portion 7 is extended from the leading edge 3A to the trailing edge 3B of the wing tip 40. The protruding portion 7 is formed in a streamline shape such that a protrusion amount from the flap body 8 is smoothly increased from the leading edge 3A side toward a middle part of the protruding portion 7 in a length direction, and the protrusion amount from the flap body 8 is then smoothly decreased toward the trailing edge 3B. A center part 7A of the protruding portion 7 in the length direction protrudes more largely than a part on the rear end 7B side.

As illustrated in FIG. 7A, the protruding portion 7 smoothly protrudes also in the span direction D2. The protruding portion 7 is formed such that the protrusion amount from the flap body 8 is smoothly increased from an end part 71 in the span direction D2 toward a middle part of the protruding portion 7 in a width direction and the protrusion amount is then smoothly decreased.

The center part 7A of the protruding portion 7 has a semicircular shape as viewed from the front side. In addition, as illustrated in FIG. 7B, the width of the protruding portion 7 is gradually decreased rearward from the center part 7A.

As illustrated in FIG. 7B, an outer shape of a part at which the protruding portion 7 rises from the lower surface 302 is determined by a straight line L1 along a side end edge 302A of the lower surface 302 and a curved line L2 that connects a front end and a rear end of the side end edge 302A. The curved line L2 is convex toward the inboard INB side with respect to the side end edge 302A.

The noise reduction effect by the flap 3 according to the present embodiment is described below.

To reduce noise, it is necessary to reduce pressure fluctuation applied to the flap 3. To do so, reduction of the pressure fluctuation of the wing-tip vortex 40V and distancing the wing-tip vortex 40V from the surface of the flap body 8 are important.

An action of the protruding portion 7 is first described.

Figure 8A:
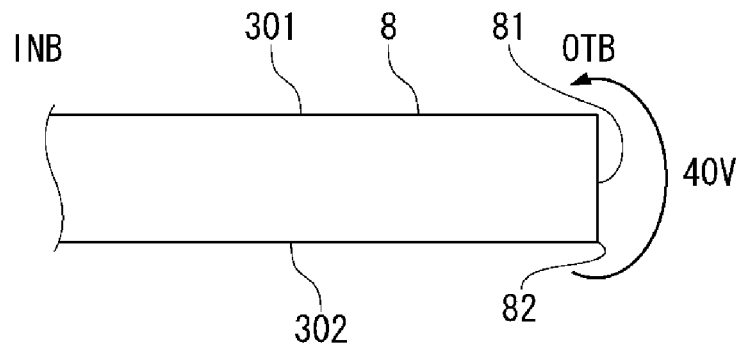
FIG. 8A is a diagram illustrating a single flap body not provided with the noise reduction device.

In the case of the single flap body 8 as illustrated in FIG. 8A, a corner part 82 is present in the path of the wing-tip vortex 40V that goes around from the lower surface 302 to the upper surface 301. The corner part 82 is formed by the lower surface 302 and the end surface 81. The direction of the airflow is changed by the corner part 82, which drastically changes the pressure of the wing-tip vortex 40V.

Figure 8B:
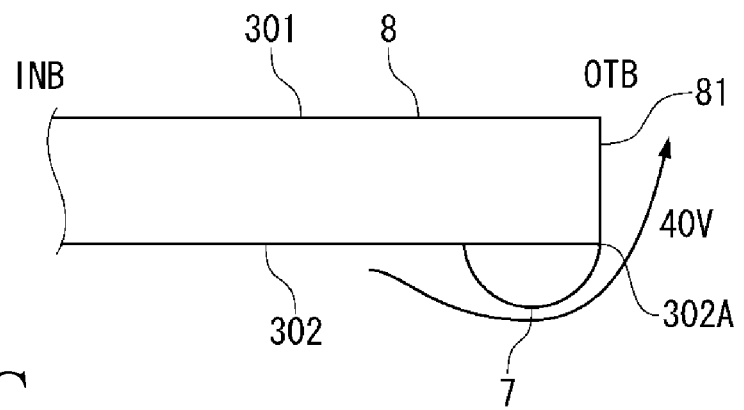
FIG. 8B is a diagram illustrating the flap provided with the device on the lower surface.

In contrast, as illustrated in FIG. 8B, when the smooth protruding portion 7 is provided on the side end edge 302A of the lower surface 302 toward the inboard INB side, the airflow from the lower surface 302 smoothly flows toward the upper surface 301 through the protruding portion 7. Therefore, the pressure fluctuation of the wing-tip vortex 40V is small.

Further, the airflow from the lower surface 302 is guided by the protruding portion 7 in a direction away from the end surface 81 of the flap body 8.

Figure 8C:
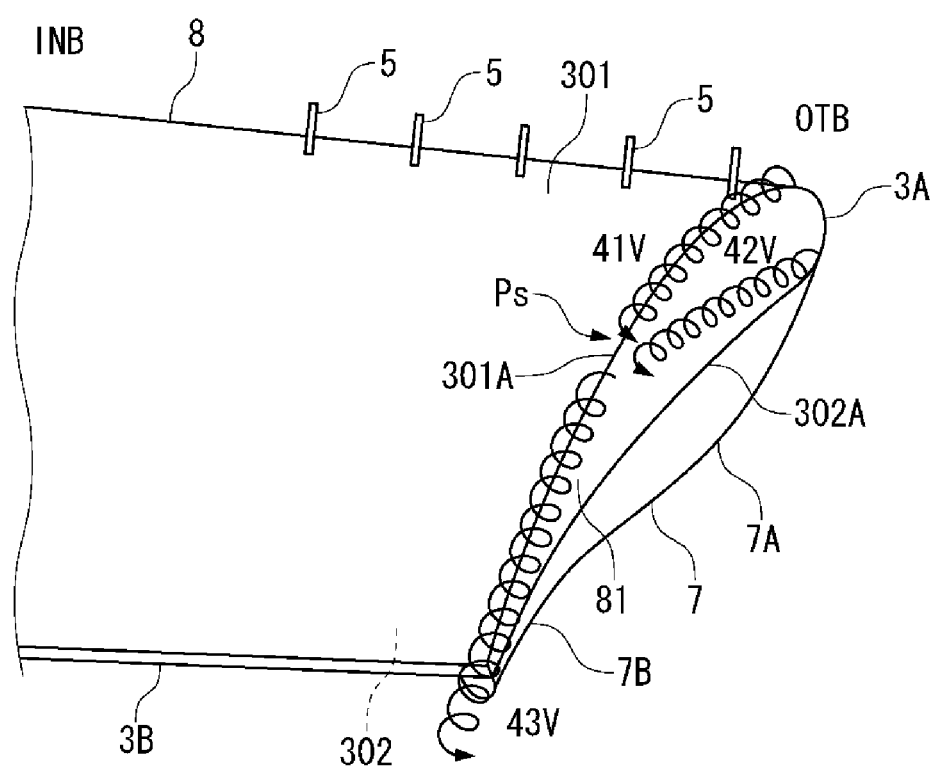
FIG. 8C is a diagram illustrating a state in which an upper wing-tip vortex and a lower wing-tip vortex are merged at the flap of FIG. 8B.

Furthermore, when the airflow of the wing-tip vortex 40 smoothly flows from the lower surface 302 toward the upper surface 301 through the protruding portion 7, the vortex 42V that has moved from the leading edge 3A of the flap body 8 to the lower surface 302 side is promptly merged with the vortex 41V on the upper surface 301 side as illustrated in FIG. 8C. As a result, the region of the flap body 8 to which the pressure fluctuation of the vortex 42V is applied is reduced by a shortened distance in the course of the vortex 42V, as compared with the case illustrated in FIG. 3. The vortex 42V recedes from the part of the flap body 8 that is out of the course of the vortex 42V.

As described above, the protruding portion 7 reduces the pressure fluctuation of the airflow flowing through the surface of the flap 3. This makes it possible to reduce the pressure fluctuation on the surface of the flap 3 and to reduce noise.

The height and the width of the protruding portion 7 according to the present embodiment are varied correspondingly to the thickness of the flap body 8 that is varied in the chord direction D3 (FIG. 7B). To reduce the pressure fluctuation, the height and the width of the protruding portion 7 are large at a position in the chord direction D3 at which the flap body 8 is formed thick, and the height and the width of the protruding portion 7 are small at a position in the chord direction D3 at which the flap body 8 is formed thin.

The shape of the protruding portion 7 is not limited to the shape in the present embodiment, and may be appropriately determined in consideration of reduction of the pressure fluctuation.

Next, action of the inclined portions 5 is described.

The inclined portions 5 respectively generate the vortices 5V that interferes the wing-tip vortex 40V.

Figure 9:
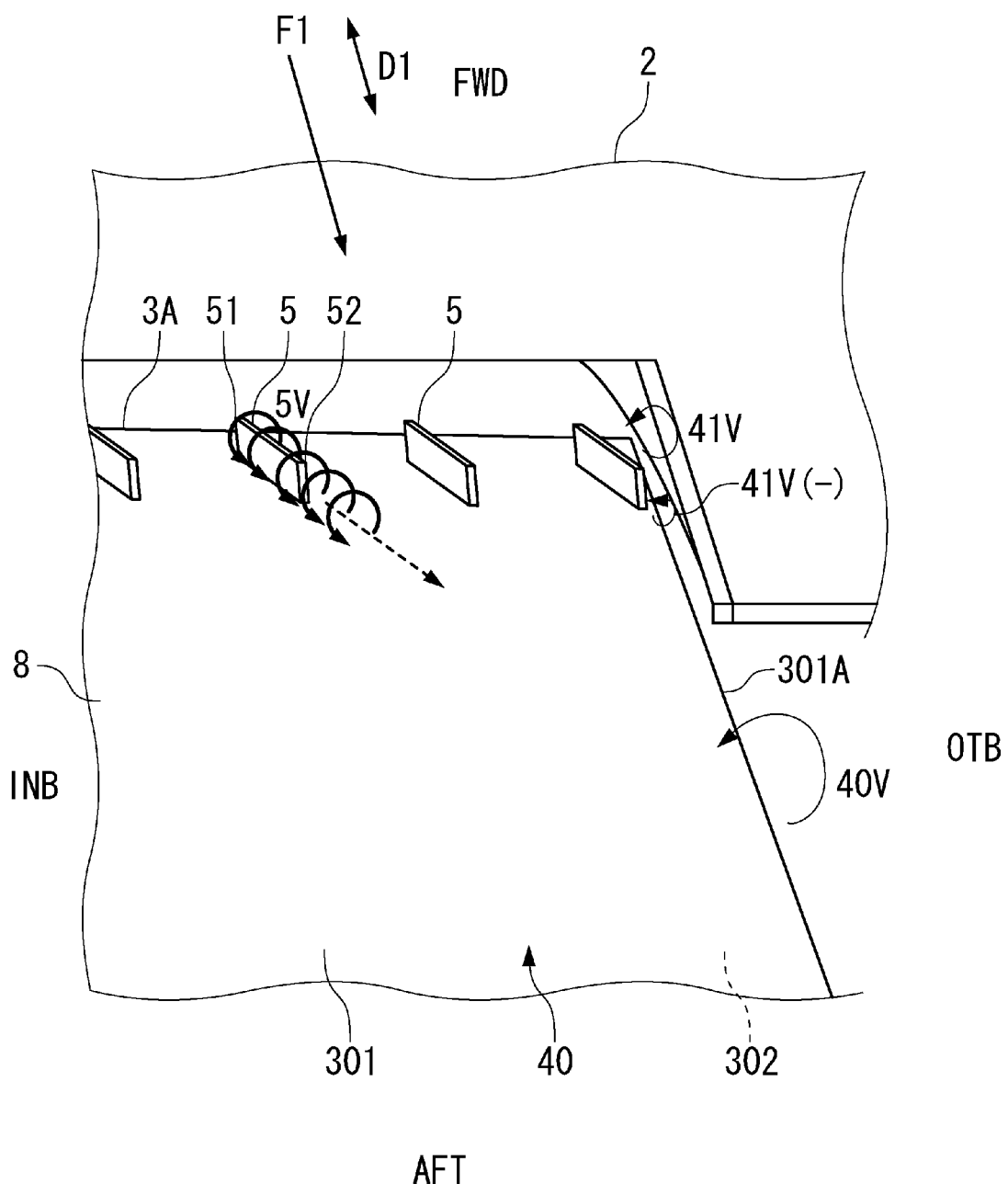
FIG. 9 is a diagram illustrating a state in which vortices generated by the inclined portions interferes the upper wing-tip vortex.
Figure 10A:
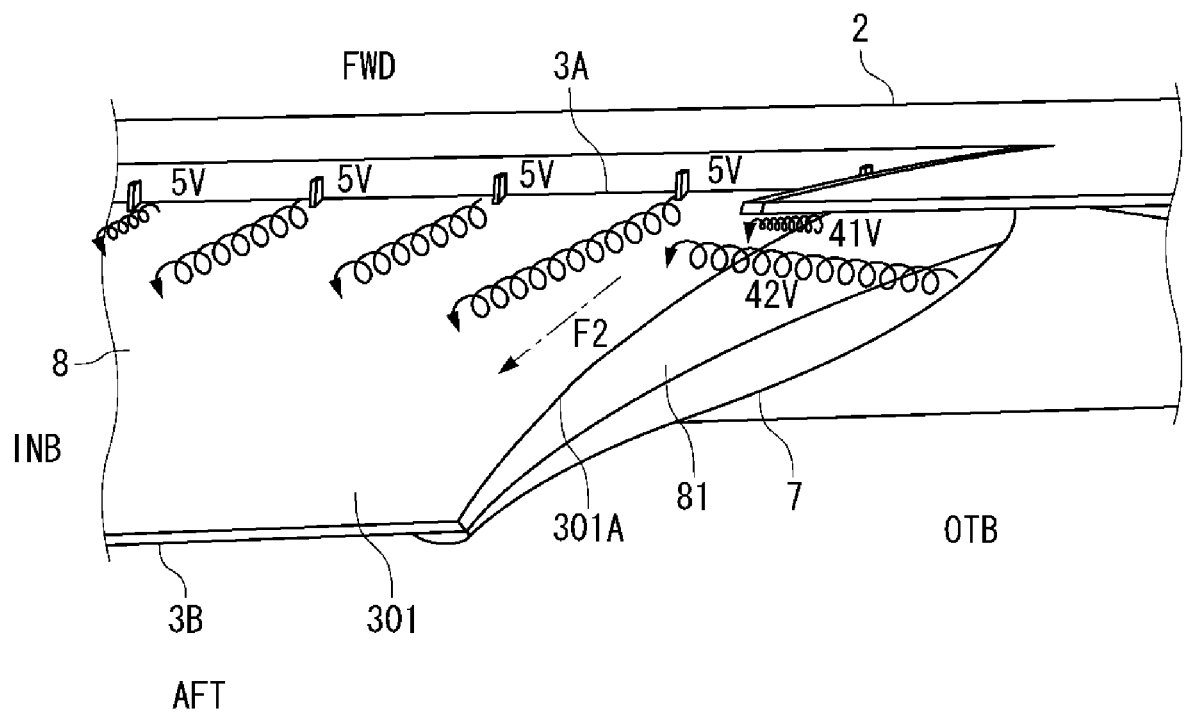
FIGS. 10A and 10B are diagrams illustrating a state in which the wing-tip vortex is drawn into the vortices generated by the inclined portions and flows rearward.
Figure 10B:
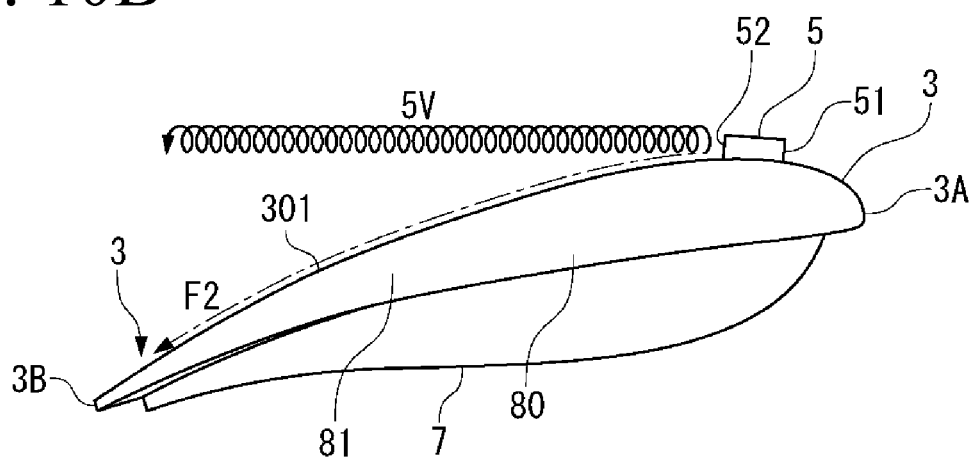

In FIG. 9, an airflow F1 that flows into the flap body 8 from the front side toward the rear side is illustrated by a straight arrow. The airflow F1 is parallel to the aircraft axis direction D1, and each of the inclined portions 5 is inclined with respect to the airflow F1. When the airflow F1 flows into the inclined portions 5 and is changed in direction by the inclined portions 5, the vortices 5V illustrated by a curved arrow are generated in a rotating direction of the arrow. The direction of the vortices 5V is represented by an arrow in a counterclockwise direction as viewed from the rear side as FIG. 9. The vortices 5V flow rearward while spirally rotating in a direction of a right-hand screw (FIGS. 10A and 10B). The rotating direction of the vortices 5V is similar to a rotating direction of the wing-tip vortex 40V that occurs at the wing tip 40 in a direction going around from the lower surface 302 to the upper surface 301. The generated vortices 5V move toward the side end edge 301A following the inclined portions 5 as moving rearward (see a dashed arrow).

Figure 11A:
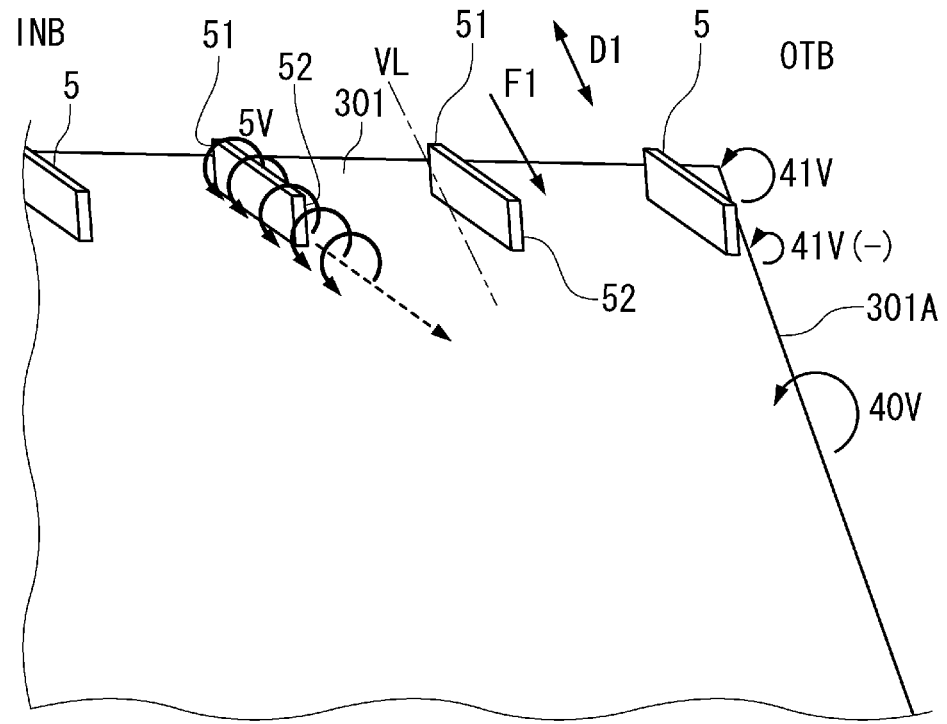
FIG. 11A is a diagram illustrating the inclined portion according to the first embodiment.
Figure 16A:
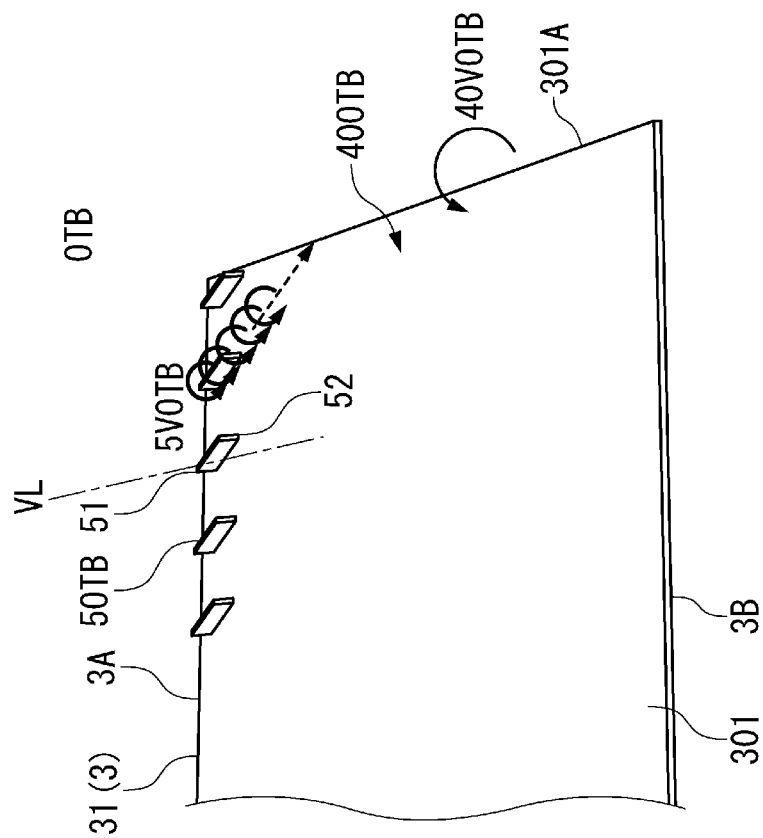
FIG. 16A is a diagram illustrating a wing-tip vortex occurred at a tip part of the flap on inboard side and inclined portions that respectively generate vortices interfering the wing-tip vortex.
Figure 16B:
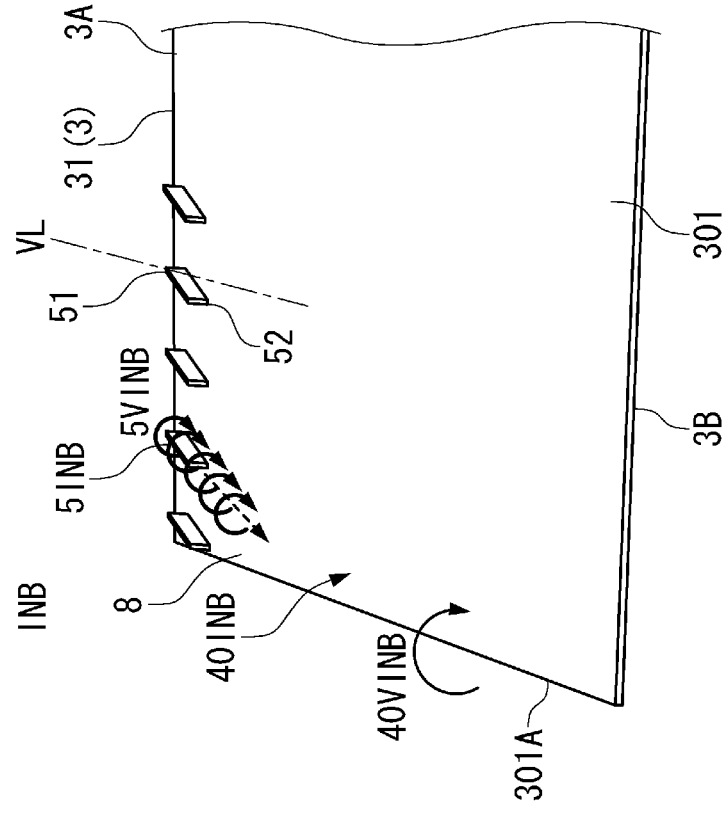
FIG. 16B is a diagram illustrating a wing-tip vortex occurred on a tip part of the flap on outboard side and inclined portions that respectively generate vortices interfering the wing-tip vortex.

The vortices 5V are respectively generated from the inclined portions 5 that are arranged on the upper surface 301 of the wing tip 40. FIG. 9 illustrates the vortex 5V generated by one of the inclined portions 5 as a representative. The similar vortex 5V is generated by the other inclined portion 5. FIG. 11A and FIGS. 16A and 16B are similarly illustrated.

The vortices 5V that have been respectively generated by the inclined portions 5 and moved to the side end edge 301A side, interfere the upper wing-tip vortex 41V. The energy of the upper wing-tip vortex 41V is weakened by the interference. The weakened upper wing-tip vortex 41V(−) is drawn into the vortices 5V rotating in the similar direction.

As illustrated in FIG. 10A, the vortices 5V sucking in the upper wing-tip vortex 41V further suck in the lower wing-tip vortex 42V and flow rearward.

In FIGS. 10A and 10B, a course F2 through which the merged upper wing-tip vortex 41V and lower wing-tip vortex 42V flow when the upper wing-tip vortex 41V is not interfered by the vortices 5V is illustrated by an alternate long and short dash arrow. The course F2 is nearly along the upper surface 301 of the flap body 8 whereas the course of the vortices 5V is away from the upper surface 301 of the flap body 8 (FIG. 10B). In other words, the upper wing-tip vortex 41V and the lower wing-tip vortex 42V are raised from the initial course F2 while being drawn into the vortices 5V. Therefore, the upper wing-tip vortex 41V and the lower wing-tip vortex 42V recede from the upper surface 301 of the flap body 8.

As described above, the upper wing-tip vortex 41V is weakened through interference of the vortices 5V generated by the inclined portions 5, and the upper wing-tip vortex 41V and the lower wing-tip vortex 42V merged therewith are drawn into the vortices 5V. This makes it possible to distance the wing-tip vortex 40 from the surface of the flap 3. As a result, the pressure fluctuation of the airflow flowing through the surface of the flap 3 is reduced, which makes it possible to reduce the pressure fluctuation of the flap 3 and to reduce the noise.

As described above, the inclined portions 5 according to the present embodiment are located at respective positions that are anterior to the merging position Ps (FIG. 8C) of the upper wing-tip vortex 41V and the lower wing-tip vortex 42V on the upper surface 301 of the flap 3 and are close to the leading edge 3A of the flap 3. The vortices 5V generated by the inclined portions 5 interfere the upper wing-tip vortex 41V at an early stage from generation on the leading edge 3A of the flap 3. The upper wing-tip vortex 41V recedes from the surface of the flap 3 through the interference of the vortices 5V, and is drawn into the vortices 5V. The lower wing-tip vortex 42V is merged with the resultant vortex.

When the inclined portions 5 are disposed near the leading edge 3A, the wing-tip vortex 41V promptly recedes from the surface of the flap 3 at an early stage through the interference of the vortices 5V. Therefore, the pressure fluctuation applied to the surface of the flap 3 is further reduced, which allows for further reduction of noise.

According to the present embodiment, it is possible to reduce noise in landing particularly requiring noise reduction, only by providing the inclined portions 5 on the flap body 8. Since the inclined portions 5 are small pieces occupying a small region of the upper surface 301 of the flap 3 and have lightweight, the inclined portions 5 hardly increase the weight of the flap 3.

In addition, the inclined portions 5 are hidden by the main wing body 2 when the flap 3 is retracted. Therefore, the inclined portions 5 do not influence aerodynamic performance in cruising.

Part of, or whole of the inclined portions 5, however, may be located at respective positions in the chord direction D3 that are exposed from the main wing body 2 in takeoff. Also in this case, influence of the inclined portions 5 to the airflow is small, and the noise in takeoff is reduced by the action of the inclined portions 5, which makes it possible to achieve the predetermined aerodynamic performance in takeoff.

A direction of inclination of the inclined portions 5 is described below.

Figure 11B:
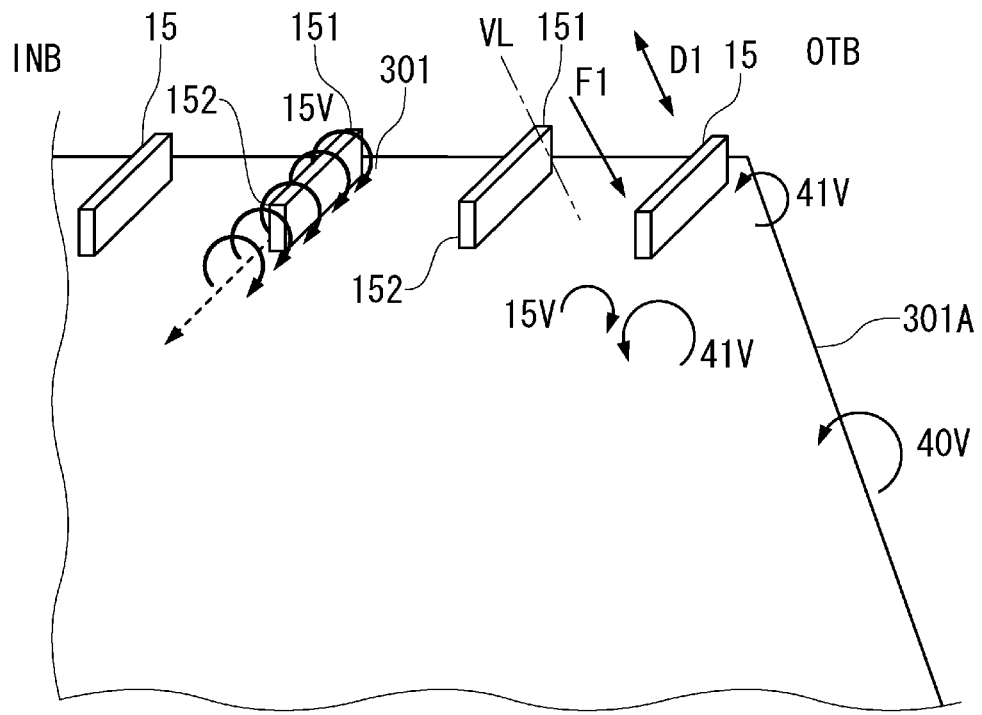
FIG. 11B is a diagram illustrating an inclined portion that is inclined in a direction opposite to the inclined portion of FIG. 11A.

FIG. 11A illustrates the inclined portions 5 according to the present embodiment, and FIG. 11B illustrates inclined portions 15 that are inclined in a direction opposite to the direction of the inclined portions 5 in FIG. 11A.

Each of the inclined portions 15 illustrated in FIG. 11B is so inclined with respect to the aircraft axis direction D1 as to recede from the side end edge 301A of the upper surface 301 from a front end 151 toward a rear end 152.

When a virtual line VL that passes through the front end 151 and is parallel to the aircraft axis direction D1 is assumed, the rear end 152 of each of the inclined portions 15 is located on side farther away from the side end edge 301A than the virtual line V1.

When the airflow F1 flows into the inclined portions 15 in parallel to the aircraft axis direction D1 and is changed in direction by the inclined portions 15, vortices 15V illustrated by a curved arrow are generated in a rotating direction (in a clockwise direction) of the arrow. The vortices 15V flow rearward following the inclined portions 15 while spirally rotating in a direction of a left-hand screw (see a dashed arrow) that is opposite to the direction of the vortices 5V that are generated by the inclined portions 5 in FIG. 11A. The vortices 15V are opposite in rotating direction to the wing-tip vortex 40V that occurs at the wing tip 40 in the direction going around from the lower surface 302 to the upper surface 301.

The vortices 15V generated by the inclined portions 15 follow the inclined portions 15 and recede from the side end edge 301A. Therefore, the vortices 15V do not sufficiently interfere the upper wing-tip vortex 41V. Accordingly, the upper wing-tip vortex 41V maintains the energy.

In addition, since the vortices 15V are opposite in the rotating direction to the wing-tip vortex 40V, the vortices 15V press the wing-tip vortex 40V against the upper surface 301 of the flap body 8 without sucking in the wing-tip vortex 40V. As a result, the wing-tip vortex 40V is maintained on the upper surface 301 of the flap body 8.

As described above, when the vortices 15V that are opposite in direction to the wing-tip vortex 40V are generated by the inclined portions 15 that are inclined in the direction opposite to the direction of the inclined portions 5 according to the present embodiment, the pressure fluctuation applied to the flap 3 by the wing-tip vortex 40V is increased, which increases noise. Increase of the strength of the vortex on the upper surface 301 of the flap 3 by the inclined portions 15 has been confirmed through computational fluid dynamics (CFD) simulation.

The noise reduction effect that has been evaluated with use of a result of the wind tunnel test using a scale model of an aircraft is described.

Figure 12:
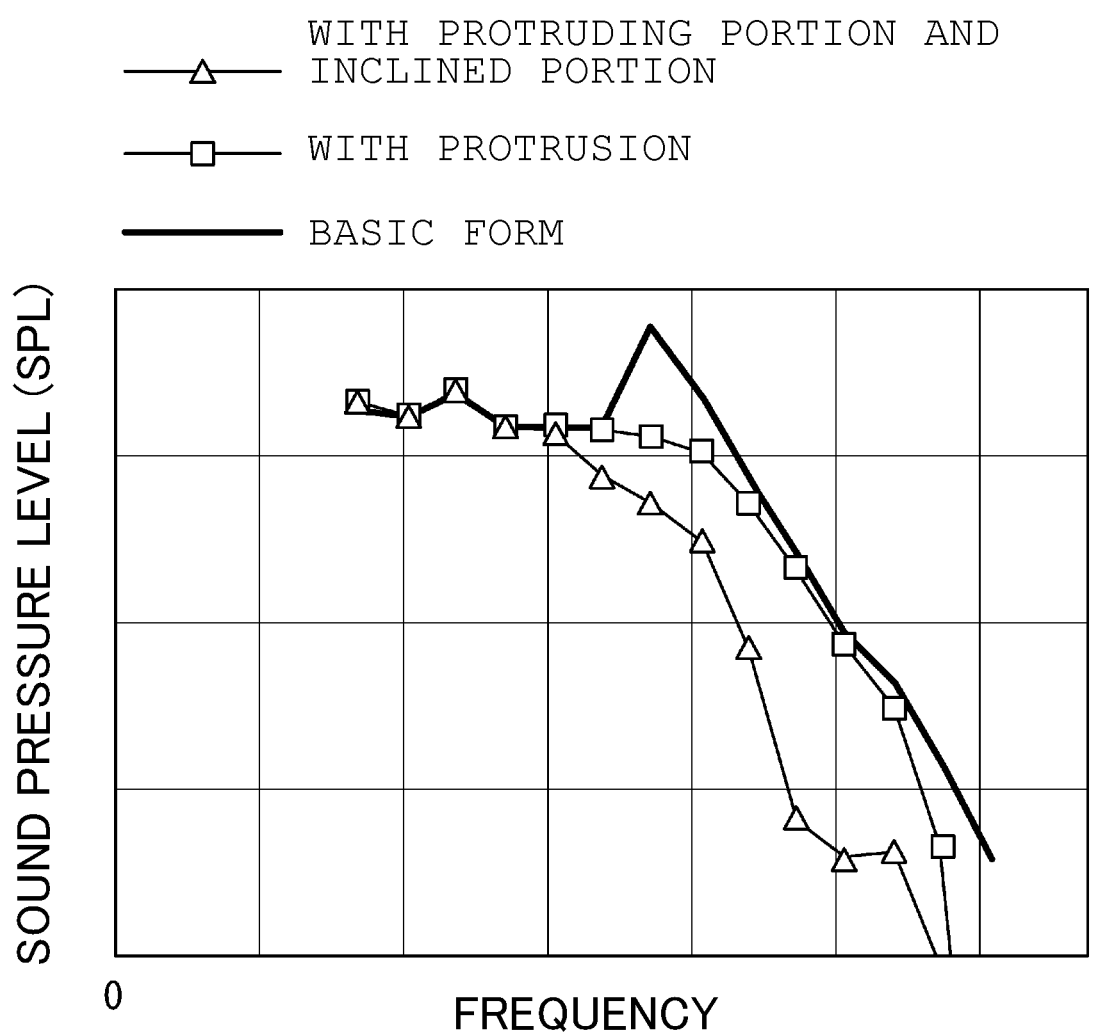
FIG. 12 is a graph illustrating noise reduction effect depending on the form of the flap by a logarithmic expression.

A sound pressure level (SPL) confirmed for the flap 3 according to the first embodiment that includes the inclined portions 5 and the protruding portion 7 is plotted by a triangle in FIG. 12. In addition, a sound pressure level confirmed for a flap that includes the protruding portion 7 but does not include the inclined portions 5 is plotted by a square. A sound pressure level confirmed for a flap (FIG. 3) in a basic form that does not include any noise reduction device is illustrated by a thick line for comparison.

As illustrated in FIG. 12, when the protruding portion 7 is provided on the flap (the flap body 8) in the basic form, it is possible to achieve noise reduction effect over a band including a peak frequency of flap noise.

Further, when the inclined portions 5 are provided in addition to the protruding portion 7, it is possible to achieve further noise reduction effect.

Second Embodiment

Next, a second embodiment of the present invention is described with reference to FIGS. 13A and 13B.

Figure 13A:
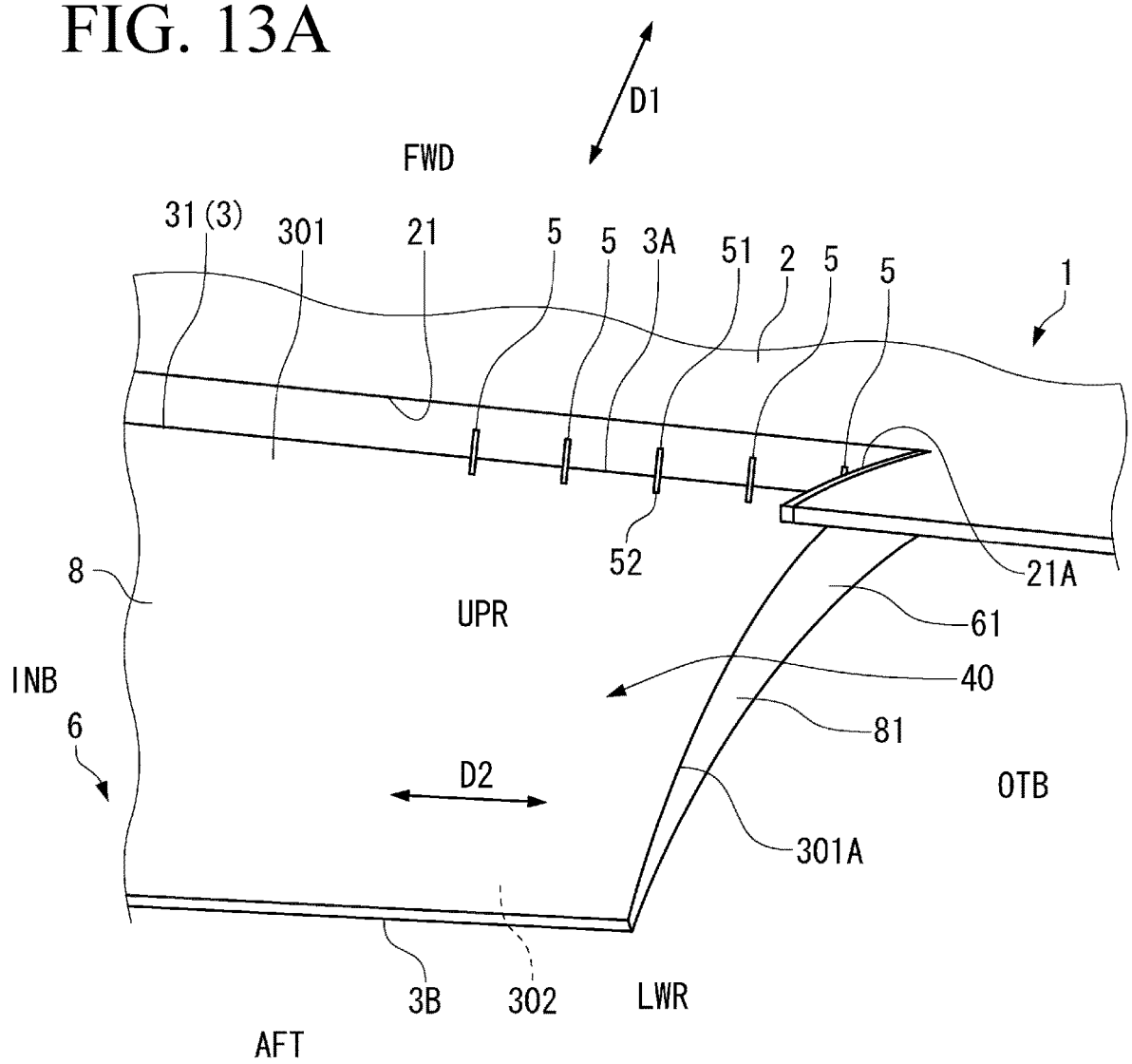
FIG. 13A and FIG. 13B are diagrams each illustrating a wing tip of a flap according to a second embodiment.
Figure 13B:
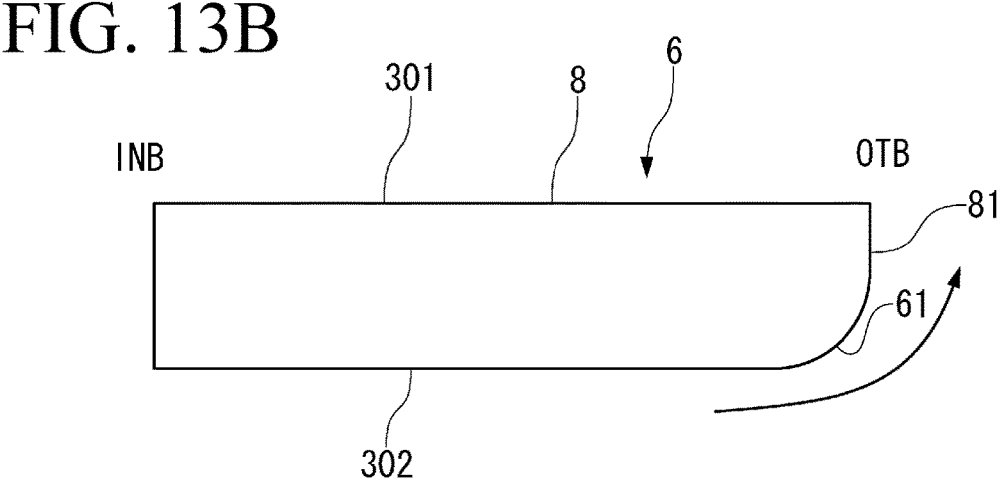

In a flap 6 according to the second embodiment, the lower surface 302 of the wing tip 40 is smoothly formed as illustrated in FIGS. 13A and 13B in place of the above-described protruding portion 7 provided on the wing tip 40. The flap 6 includes the inclined portions 5 (FIG. 13A) serving as the noise reduction device. Illustration of the inclined portions 5 is omitted in FIG. 13B.

When a round part 61 is present on the lower surface 302 of the wing tip 40 of the flap 6, it is possible to achieve action similar to the action by the protruding portion 7 described with reference to FIGS. 8A to 8C. The round part 61 is smoothly formed by rounding the corner formed by the lower surface 302 and the end surface 81.

In other words, the airflow from the lower surface 302 of the wing tip 40 smoothly flows toward the upper surface 301 through the round part 61. Therefore, the pressure fluctuation of the wing-tip vortex 40V is small.

In addition, the airflow from the lower surface 302 is guided by the round part 61 in a direction away from the end surface 81 (see an arrow in FIG. 13B).

Further, the airflow smoothly flows from the lower surface 302 toward the upper surface 301 through the round part 61, which causes the lower wing-tip vortex 42V to be promptly merged with the upper wing-tip vortex 41V similarly to the case illustrated in FIG. 8C. Therefore, the region of the flap 6 to which the pressure fluctuation of the lower wing-tip vortex 42V is applied is reduced.

As described above, since the round part 61 reduces the pressure fluctuation of the airflow flowing through the surface of the flap 6, the pressure fluctuation of the surface of the flap 6 is reduced, which makes it possible to reduce noise.

The protruding portion 7 according to the first embodiment may be further provided on the flap 6 including the round part 61 according to the second embodiment. In this case, the pressure fluctuation on the surface of the flap 6 is reduced by the round part 61 and the protruding portion 7, which makes it possible to reduce noise.

An example of an installation form of the above-described inclined portions 5 is described.

Figure 14:
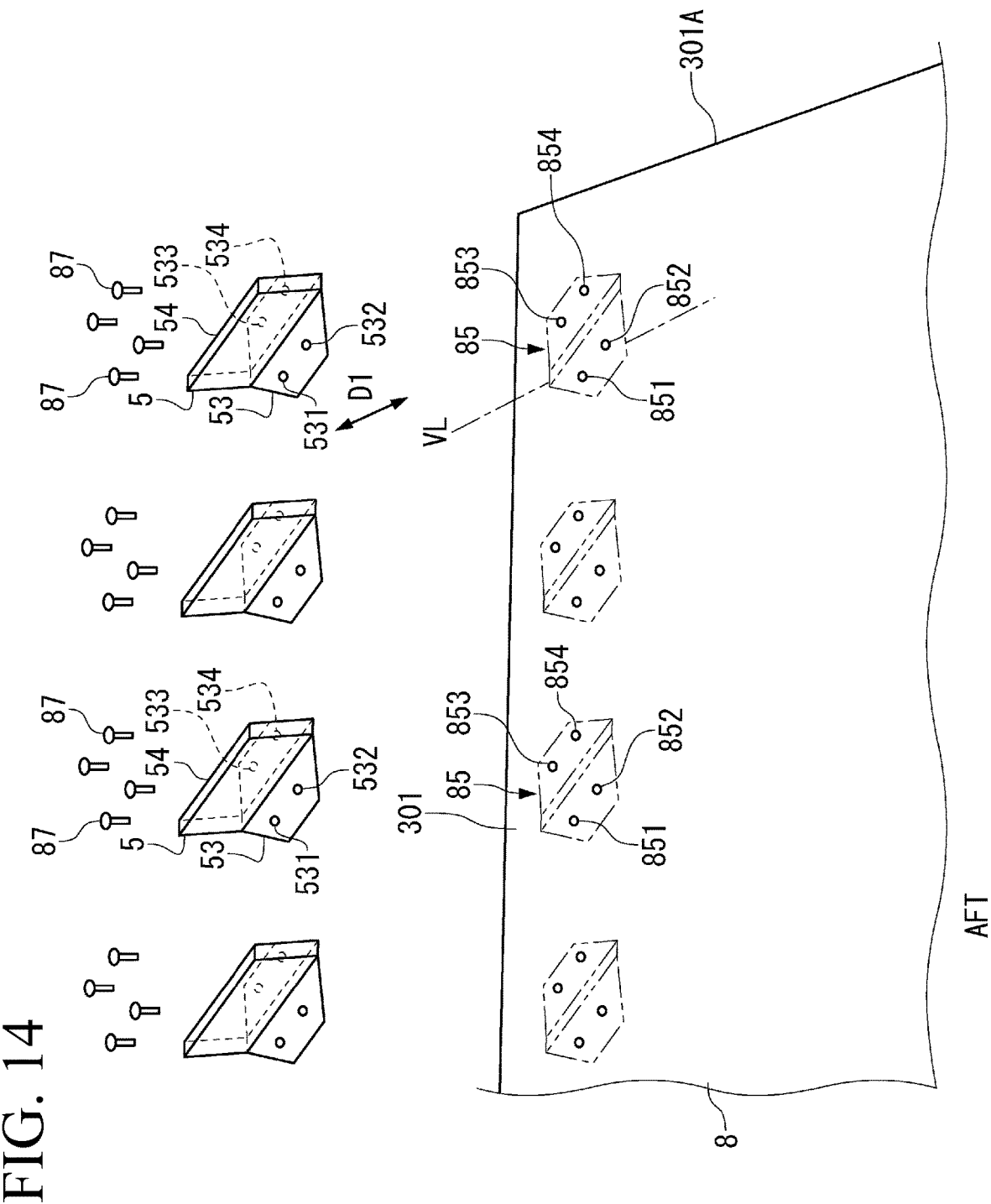
FIG. 14 is a diagram illustrating an example of an installation form of an inclined portion.

FIG. 14 illustrates an example in which the inclined portions 5 are installed on the upper surface 301 of the flap body 8 with use of fasteners 87.

Each of the inclined portions 5 includes a pedestal 53 and a protrusion 54. A plurality of holes 531 to 534 into which the fasteners 87 are respectively inserted are provided in the pedestal 53. The protrusion 54 is erected on the pedestal 53. The pedestal 53 is formed on both sides of the protrusion 54 in a substantially symmetrical manner.

The inclined portions 5 are fastened to the flap body 8 by the fasteners 87.

As the fasteners 87, rivets and bolts may be used.

The flap body 8 includes installation portions 85 that protrude from the upper surface 301 of the wing tip 40 and on which the respective inclined portions 5 can be installed. The same number of installation portions 85 as the number of the inclined portions 5 are provided at positions corresponding to the respective inclined portions 5. A region on the flap body 8 on which the pedestal 53 is disposed is illustrated by an alternate long and two short dashes line.

Each of the installation portions 85 is disposed near the leading edge 3A of the flap body 8, and includes a plurality of fastener insertion parts 851 to 854 into which the fasteners 87 are respectively inserted.

The fastener insertion parts 851 and 852 correspond to one side of the pedestal 53 of each of the inclined portions 5. The fastener insertion part 851 is located on the front side and the fastener insertion part 852 is located on the rear side. Further, the fastener insertion part 852 is located closer to the side end edge 301A than a virtual line VL that passes through the fastener insertion part 851 and is parallel to the aircraft axis direction D1.

The positional relationship of the fastener insertion parts 853 and 854 that correspond to the other side of the pedestal 53 of each of the inclined portions 5 is similar to the above.

Providing the installation portion 85 and fastening the pedestal 53 of the inclined portion 5 and the flap with the fasteners 87 makes it possible to provide the inclined portion 5 on an existing flap not including the inclined portion 5.

When the bolts are used as the fasteners 87, each of the inclined portions 5 is detachably disposed on the flap body 8. This improves maintainability such as replacement and repair.

A larger number of fasteners 87 may be used to fasten the inclined portions 5.

Third Embodiment

A third embodiment of the present invention is described with reference to FIGS. 15A,15B and FIGS. 16A,16B.

Figure 15A:
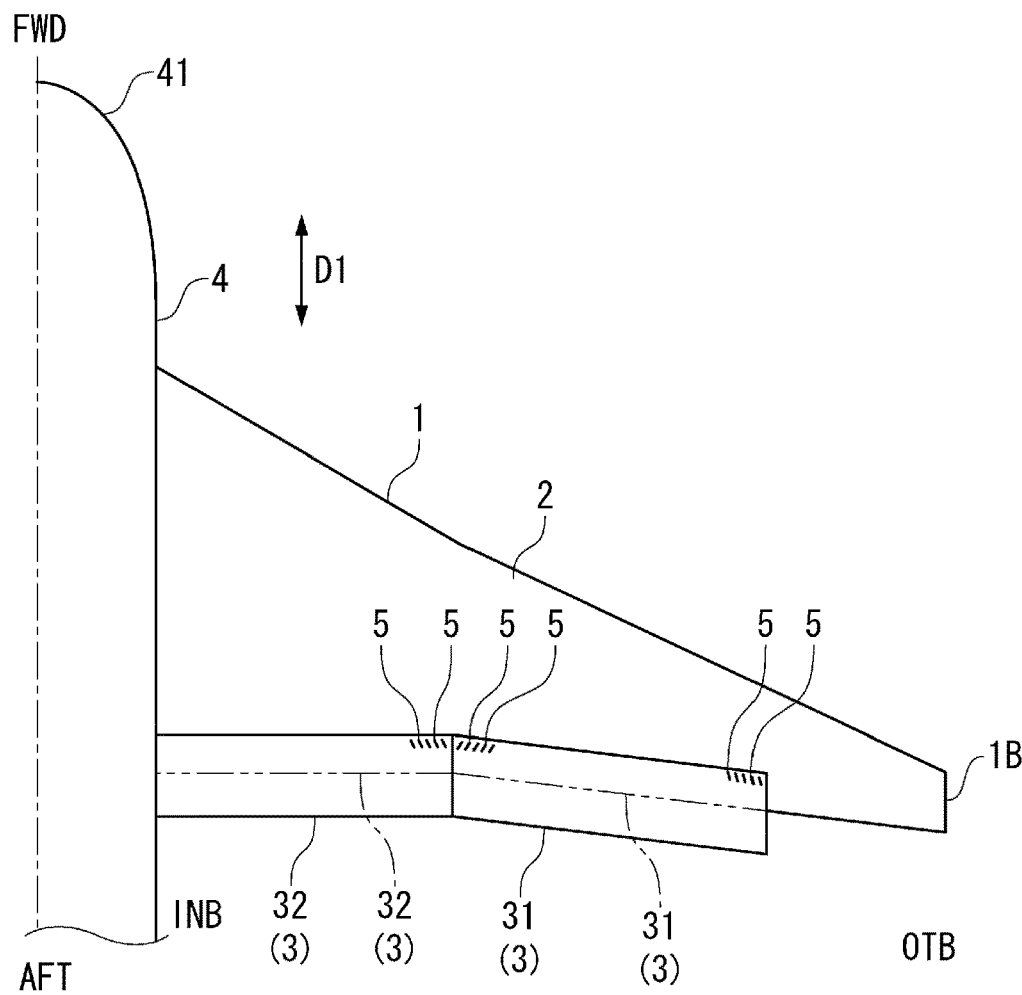
FIGS. 15A and 15B are plan views illustrating an aircraft and a flap according to a third embodiment.
Figure 15B:
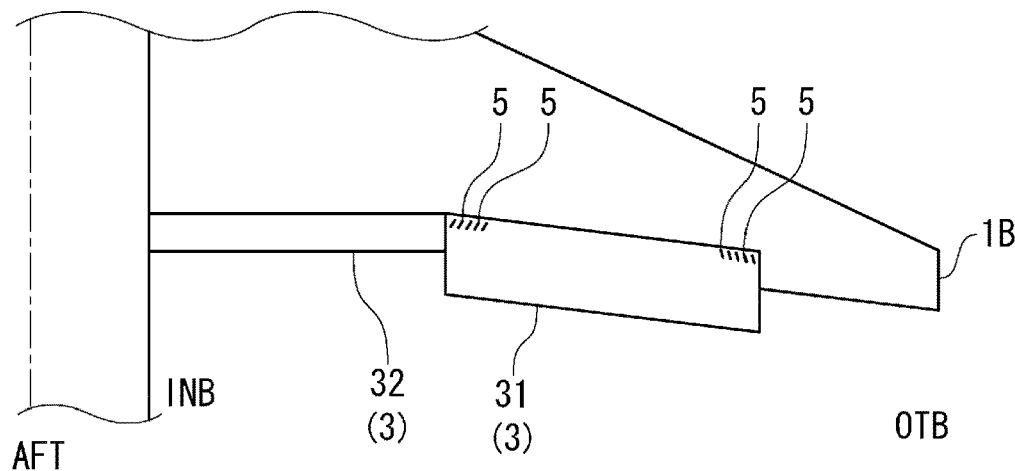

In the third embodiment, as illustrated in FIGS. 15A and 15B, the inclined portions 5 are provided on the tip part of the outboard flap 31 on the inboard INB side, in addition to the tip part on the outboard OTB side.

Further, the protruding portion 7 (FIGS. 7A and 7B) that smoothly protrudes from the lower surface 302 of each flap is provided on each of the tip part of the outboard flap 31 on the outboard OTB side and the tip part on the inboard INB side.

Moreover, the inclined portions 5 are provided on the tip part of the inboard flap 32 on the outboard OTB side. The protruding portion 7 (FIGS. 7A and 7B) that smoothly protrudes is also provided on the rear surfaces of the respective inclined portions 5, namely, on the lower surface 302 of the tip part of the inboard flap 32 on the outboard OTB side.

Illustration of the protruding portion 7 is omitted in FIGS. 15A,15B and FIGS. 16A,16B.

In FIGS. 15A and 15B, the outboard flap 31 and the inboard flap 32 are both deployed. In the present embodiment, however, the outboard flap 31 and the inboard flap 32 are deployed at different timing in some cases. In FIG. 15A, the outboard flap 31 and the inboard flap 32 both in a retracted state are illustrated by an alternate long and two short dash line.

FIG. 15B illustrates a state where the outboard flap 31 is deployed and the inboard flap 32 is retracted. At this time, the inclined portions 5 on the outboard flap 31 function.

Although not illustrated, when the inboard flap 32 is deployed and the outboard flap 31 is retracted, the inclined portions 5 of the inboard flap 32 are exposed and function.

When only the outboard flap 31 is deployed out of the outboard flap 31 and the inboard flap 32, the tip part of the outboard flap 31 on the inboard INB side corresponds to a wing tip that protrudes in the airflow and causes the wing-tip vortex.

Further, when only the inboard flap 32 is deployed, the tip part of the inboard flap 32 on the outboard OTB side corresponds to the wing tip that protrudes in the airflow and causes the wing-tip vortex 40V.

Therefore, according to one or more embodiments of the present invention, the inclined portions 5 may be disposed on each of the wing tips to reduce noise caused by the wing-tip vortices that occur at the wing tips.

On the tip part of the inboard flap 32 on the outboard OTB side, the wing-tip vortex 40V occurs in a direction similar to the direction of the wing-tip vortex 40V at the tip part (the wing tip 40 in FIGS. 8A to 8C) of the outboard flap 31 on the outboard OTB side. Therefore, the direction of the inclination of the inclined portions 5 that generate the vortices 5V interfering the wing-tip vortex 40V is similar to the direction of the inclination of the inclined portions 5 that are located on the tip part of the outboard flap 31 on the outboard OTB side. Since the function effect similar to the function effect by the inclined portions 5 that are located on the outboard flap 31 on the outboard OTB side described in the first embodiment is obtainable by the inclined portions 5 that is located on the inboard flap 32 on the outboard side OTB. Therefore, the description thereof is omitted.

As illustrated in FIG. 16A, a wing-tip vortex 40VINB in a direction opposite to the direction of a wing-tip vortex 40VOTB that occurs at a tip part 40OTB of the outboard flap 31 on the outboard side illustrated in FIG. 16B, occurs at a tip part 40INB of the outboard flap 31 on the inboard side.

Therefore, the direction of the vortex that interferes the wing-tip vortex 40VINB is opposite to the direction of vortices 5VOTB generated by inclined portions 5OTB on the outboard side. Accordingly, inclined portions 5INB of the tip part 40INB are disposed at an inclination angle in a direction opposite to the direction of the inclined portions 5OTB on the outboard side.

The inclined portions 5OTB on the outboard side and the inclined portions 5INB on the inboard side, however, are inclined in the similar direction based on the virtual line VL. In other words, the rear end 52 of each of the inclined portions 5INB on the inboard side is located on the side close to the side end edge 301A of the tip part 40INB than the virtual line VL that passes through the front end 51 of each of the inclined portions 5INB on the inboard side and is parallel to the aircraft axis direction D1.

Action of the vortices 5VINB generated by the respective inclined portions 5INB located on the tip part 40INB on the inboard side makes it possible to weaken the wing-tip vortex 40VINB and to distance the wing-tip vortex 40VINB from the surface of the flap body 8, which allows for reduction of noise caused by the wing-tip vortex 40VINB.

Figure 17A:
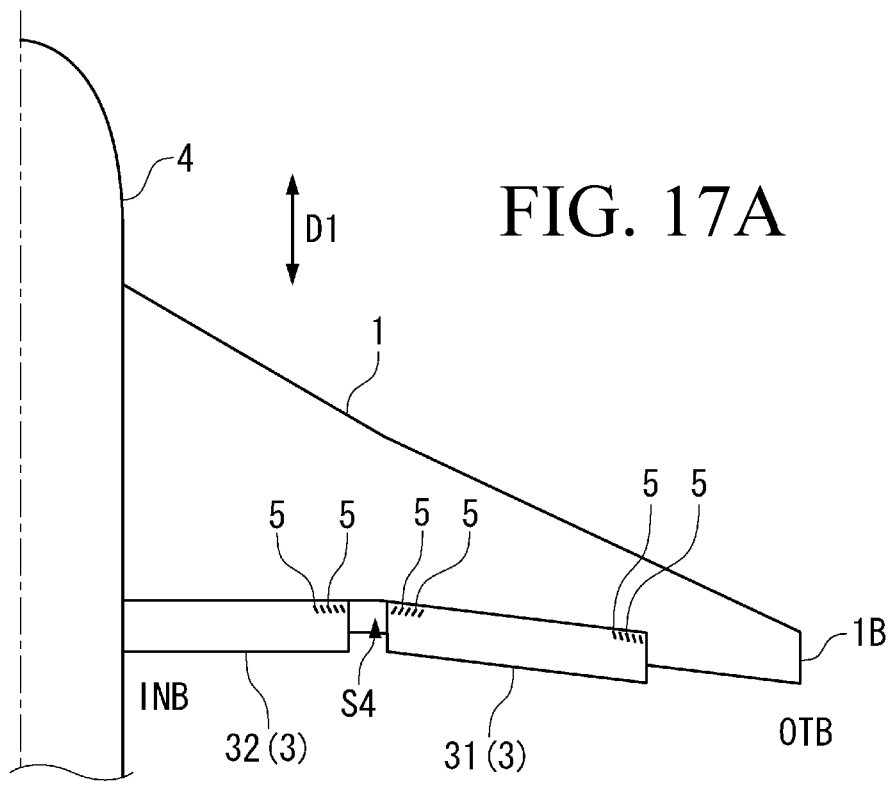
FIG. 17A and FIG. 17B are plan view each illustrating an aircraft and a flap according to a modification of one or more embodiments of the present invention.
Figure 17B:
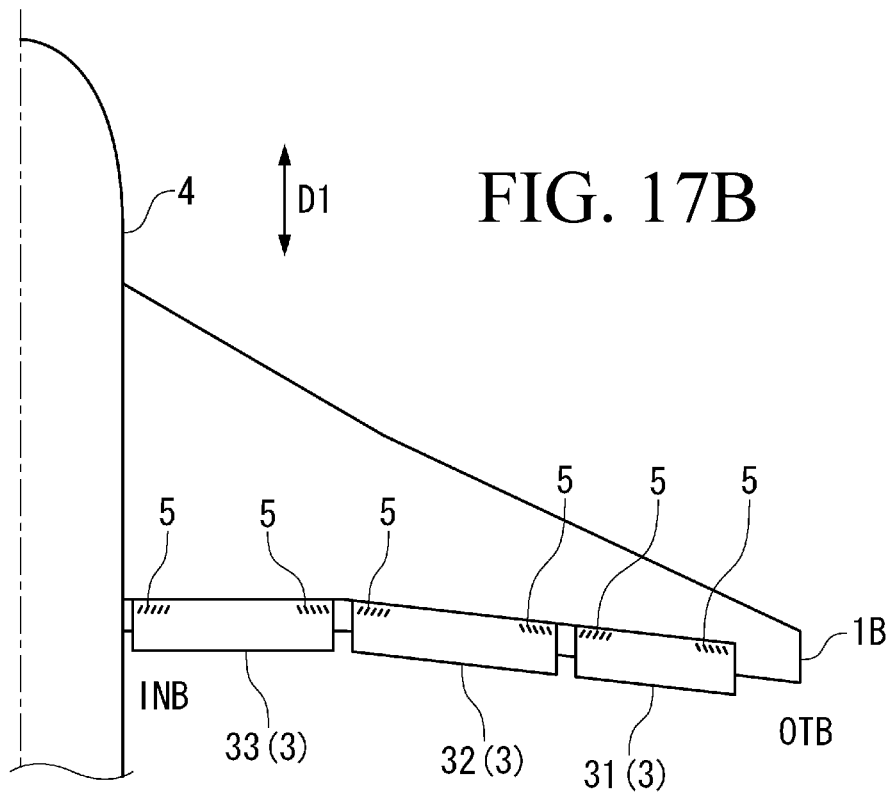

FIGS. 17A and 17B each illustrate a modification of one or more embodiments of the present invention.

The above-described outboard flap 31 and the above-described inboard flap 32 are disposed adjacently to each other; however, the outboard flap 31 and the inboard flap 32 may be disposed with a predetermined interval S4 in between as illustrated in FIG. 17A. Another member may be disposed between the outboard flap 31 and the inboard flap 32.

Further, in one or more embodiments of the present invention, the number of flaps provided on the aircraft is not limited, and three flaps 31, 32, and 33 may be disposed on each of a right board and a left board as illustrated in FIG. 17B.

In a configuration illustrated in each of FIGS. 17A and 17B, the inclined portions 5 are provided on the upper surface of the wing tip on at least the outboard side and the above-described protruding portion 7 (not illustrated) is smoothly protruded from the lower surface of the wing tip 40 on at least the outboard side, on all of the flaps 3.

Note that the inclined portions 5 and the protruding portion 7 may be provided on some of the plurality of flaps provided on the aircraft.

The round part 61 (FIGS. 13A and 13B) may be provided in place of or together with the protruding portion 7.

Other than the above, the configurations of the above-described embodiments may be selected or may be appropriately modified without departing from the scope of the present invention.

One or more embodiments of the present invention is applicable to a flap having an appropriate form such as a slotted flap and a fowler flap.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 Main wing
1A Trailing edge
1B Wing tip
2 Main wing
2A Trailing edge
3 Flap
3A Leading edge
3B Trailing edge
4 Fuselage
5 Inclined portion
5INB Inclined portion
5OTB Inclined portion
5V Vortex
5VINB Vortex
5VOTB Vortex
6 Flap
7 Protruding portion
7A Front end
8 Flap body
15 Inclined portion
15V Vortex
21 Housing section
21A Inner wall
21B Wall
31 Outboard flap
32 Inboard flap
40 Wing tip
40INB Tip part
40OTB Tip part
40V Wing-tip vortex
40VINB Wing-tip vortex
40VOTB Wing-tip vortex
41V Upper wing-tip vortex
42V Lower wing-tip vortex
43V Vortex
51 Front end
52 Rear end
53 Pedestal
54 Protrusion
61 Round part
71 End part
80 End rib
81 End surface
82 Corner part
85 Installation portion
87 Fastener
102 Lower surface
151 Front end
152 Rear end
301 Upper surface
301A Side end edge
302 Lower surface
302A Side end edge
531, 532 Hole
851, 852 Fastener insertion part
CL Chord length
D1 Aircraft axis direction
D2 Span direction
D3 Chord direction
F Airflow
F1 Airflow
F2 Course
L1 Straight line
L2 Curved line
R Region
S1 Gap
S2 Clearance
S3 Space
VL Virtual line
θ Inclination angle

The invention claimed is:

1. A flap of an aircraft, comprising:
   a flap body that is provided deployably with respect to a main wing;
   a plurality of first inclined portions that protrude from an upper surface of a tip part on an outboard side in a span direction of the flap body and are inclined with respect to an axis of the aircraft that is parallel to a fuselage of the aircraft; and
   a protruding portion that smoothly protrudes from a lower surface of the tip part on at least the outboard side, wherein
   each of the plurality of first inclined portions is a protrusion that protrudes, starting from a front end along an entire length to a rear end of each of the plurality of first inclined portions, from the upper surface, and
   for each of the plurality of first inclined portions, a distance from the rear end to a side end edge of the tip part on the outboard side in the span direction of the flap body is shorter than a distance from a virtual line that passes through the front end to the side end edge of the tip part, wherein the virtual line is parallel to the axis of the aircraft, and wherein the plurality of first inclined portions are disposed within a region from a position of the side end edge of the flap body to a position that is separated from the side end edge by a chord length of the flap body in the span direction, and wherein two or more of the first inclined portions are adjacently arranged next to each other in the span direction and inclined such that the rear end of the two or more of the first inclined portions is located closer to the side end edge of the flap body compared to the front end of the two or more of the first inclined portions, wherein the adjacent two or more of the first inclined portions are oriented in a same inclination direction.

2. The flap according to claim 1, wherein the plurality of first inclined portions are disposed only within the region from the position of the side end edge of the flap body to the position that is separated from the side end edge by the chord length of the flap body in the span direction.

3. The flap according to claim 1,
wherein the front end and the rear end of each of the plurality of first inclined portions are both disposed near a leading edge of the flap body, and
wherein each of the plurality of first inclined portions is:
exposed from the main wing when the flap body is totally deployed, and
hidden by the main wing when the flap body is retracted in the main wing.

4. The flap according to claim 1, wherein each of the plurality of first inclined portions is a protrusion that has a rectangular cross-section over an entire length from the front end to the rear end.

5. The flap according to claim 1, wherein a length and a height of each of the plurality of first inclined portions satisfy $L/h > 1$, where L is the length and h is the height.

6. The flap according to claim 1, wherein a length and a height of each of the plurality of first inclined portions satisfy $3 \leq L/h \leq 10$, where L is the length and h is the height.

7. The flap according to claim 1, wherein an inclination angle of each of the plurality of first inclined portions is within a range of 10 degrees to 30 degrees.

8. An aircraft comprising the flap according to claim 1.

9. The flap according to claim 1, further comprising:
a second inclined portion that protrudes from the upper surface of the tip part on an inboard side in the span direction of the flap body and is inclined with respect to the axis of the aircraft.

10. The flap according to claim 1, wherein the plurality of first inclined portions are disposed in a single horizontal row.

11. A flap of an aircraft, comprising:
a flap body that is provided deployably with respect to a main wing; and
a plurality of first inclined portions that protrude from an upper surface of a tip part on an outboard side in a span direction of the flap body and are inclined with respect to an axis of the aircraft that is parallel to a fuselage of the aircraft, wherein
the tip part on at least the outboard side is smoothly formed on a lower surface side,
each of the plurality of first inclined portions is a protrusion that protrudes, starting from a front end along an entire length to a rear end of each of the plurality of first inclined portions, from the upper surface, and for each of the plurality of first inclined portions, a distance from the rear end to a side end edge of the tip part on the outboard side in the span direction of the flap body is shorter than a distance from a virtual line that passes through the front end to the side end edge of the tip part, wherein the virtual line is parallel to the axis of the aircraft, and wherein the plurality of first inclined portions are disposed within a region from a position of the side end edge of the flap body to a position that is separated from the side end edge by a chord length of the flap body in the span direction, and wherein two or more of the first inclined portions are adjacently arranged next to each other in the span direction and inclined such that the rear end of the two or more of the first inclined portions is located closer to the side end edge of the flap body compared to the front end of the two or more of the first inclined portions, wherein the adjacent two or more of the first inclined portions are oriented in a same inclination direction.

12. The flap according to claim 11, wherein the plurality of first inclined portions are disposed only within the region from the position of the side end edge of the flap body to the position that is separated from the side end edge by the chord length of the flap body in the span direction.

13. The flap according to claim 11,
wherein the front end and the rear end of each of the plurality of first inclined portions are both disposed near a leading edge of the flap body, and
wherein each of the plurality of first inclined portions is:
exposed from the main wing when the flap body is totally deployed, and
hidden by the main wing when the flap body is retracted in the main wing.

14. The flap according to claim 11, wherein each of the plurality of first inclined portions is a protrusion that has a rectangular cross-section over an entire length from the front end to the rear end.

15. The flap according to claim 14, wherein a length and a height of each of the plurality of first inclined portions satisfy $L/h > 1$, where L is the length and h is the height.

16. The flap according to claim 14, wherein a length and a height of each of the plurality of first inclined portions satisfy $3 \leq L/h \leq 10$, where L is the length and h is the height.

17. The flap according to claim 11, wherein an inclination angle of each of the plurality of first inclined portions is within a range of 10 degrees to 30 degrees.

18. An aircraft comprising the flap according to claim 11.

19. The flap according to claim 11, further comprising:
a second inclined portion that protrudes from the upper surface of the tip part on an inboard side in the span direction of the flap body and is inclined with respect to the axis of the aircraft.

20. The flap according to claim 11, wherein the plurality of first inclined portions are disposed in a single horizontal row.

21. A flap of an aircraft, comprising:
a flap body that is provided deployably with respect to a main wing;
a plurality of first inclined portions that protrude from an upper surface of a tip part on an outboard side in a span direction of the flap body and are inclined with respect to an axis of the aircraft that is parallel to a fuselage of the aircraft; and
a protruding portion that smoothly protrudes from a lower surface of the tip part on at least the outboard side, wherein each of the plurality of first inclined portions is a protrusion that protrudes, starting from a front end along an entire length to a rear end of each of the plurality of first inclined portions, from the upper surface, for each of the plurality of first inclined portions, a distance from the rear end to a side end edge of the tip part on the outboard side in the span direction of the flap body is shorter than a distance from a virtual line that passes through the front end to the side end edge of the tip part, wherein the virtual line is parallel to the axis of the aircraft, and the flap is configured such that a lower surface of the flap body is totally exposed from a lower side of the main wing when the flap is retracted.

\* \* \* \* \*